(12) United States Patent
Iwaki et al.

(10) Patent No.: US 6,415,664 B2
(45) Date of Patent: Jul. 9, 2002

(54) ANGULAR VELOCITY SENSOR CAPABLE OF PREVENTING UNNECESSARY OSCILLATION

(75) Inventors: Takao Iwaki, Chiryu; Kazuhiko Kano, Toyoake; Toshiki Isogai, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/778,737

(22) Filed: Feb. 8, 2001

(30) Foreign Application Priority Data

Feb. 18, 2000 (JP) ........................................ 2000-046793
Oct. 26, 2000 (JP) ........................................ 2000-327504

(51) Int. Cl.7 ................................................ G01P 9/00
(52) U.S. Cl. ................................................ 73/504.12
(58) Field of Search ........................ 73/504.12, 504.14, 73/504.15, 504.16, 509, 514.17, 514.18

(56) References Cited

U.S. PATENT DOCUMENTS 5,604,312 A 2/1997 Lutz
5,728,936 A 3/1998 Lutz
5,734,105 A 3/1998 Mizukoshi
6,070,463 A * 6/2000 Moriya et al. ........... 73/504.12

FOREIGN PATENT DOCUMENTS

JP 11-248733 9/1999

* cited by examiner

*Primary Examiner*—Richard A. Moller
(74) *Attorney, Agent, or Firm*—Law Offices of David G. Posz

(57) ABSTRACT

An angular velocity sensor has a weight portion that can be drive-oscillated in a driving direction and be oscillated in a detecting direction when an angular velocity is applied, and unnecessary oscillation suppressing electrodes that can generate an electrostatic force to be applied to the weight portion in the detecting direction. The electrostatic force prevents the weight portion from being drive-oscillated in a direction other than the driving direction. As a result, unnecessary oscillation of the weight portion can be prevented even when the angular velocity sensor has a processing error.

14 Claims, 16 Drawing Sheets

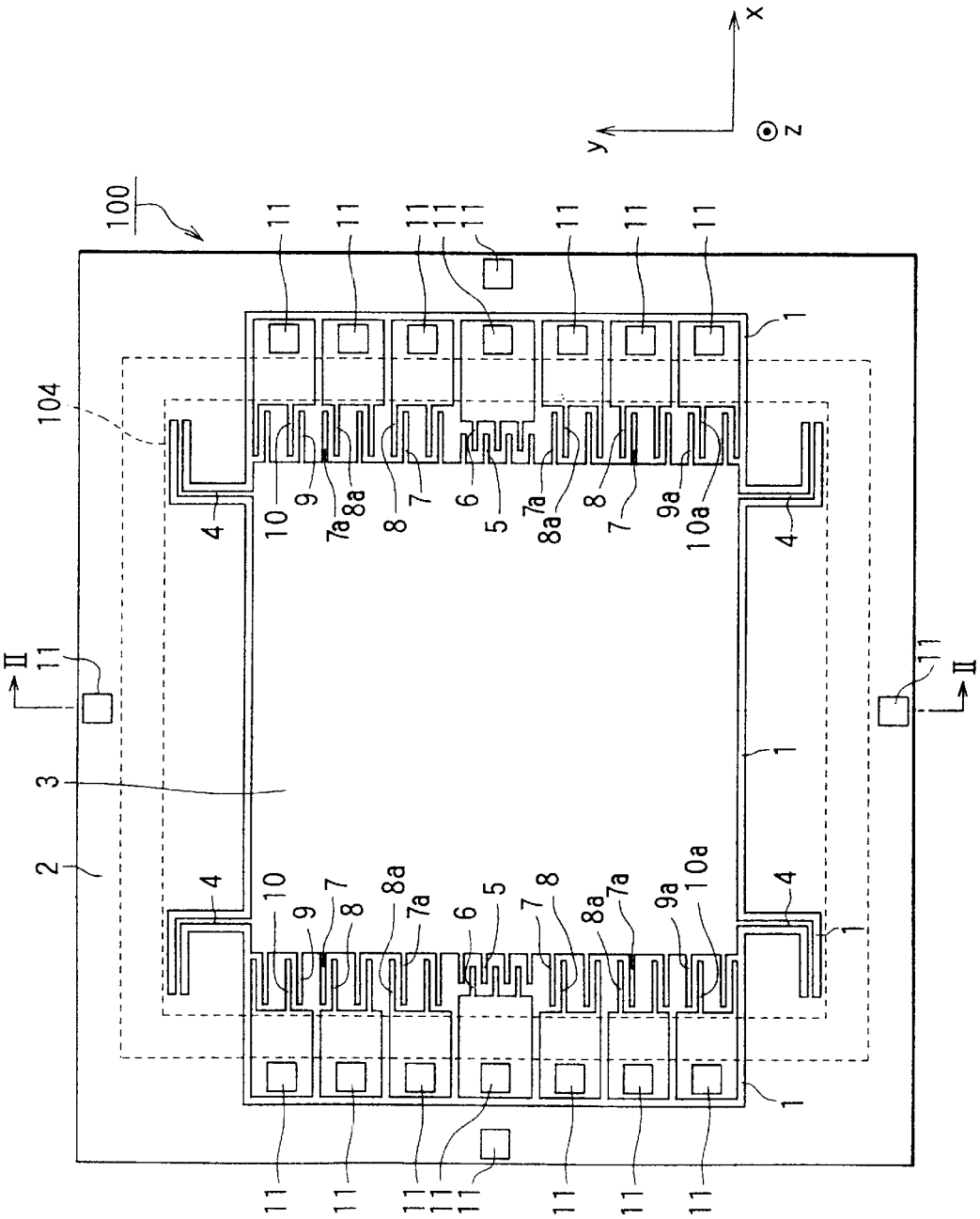

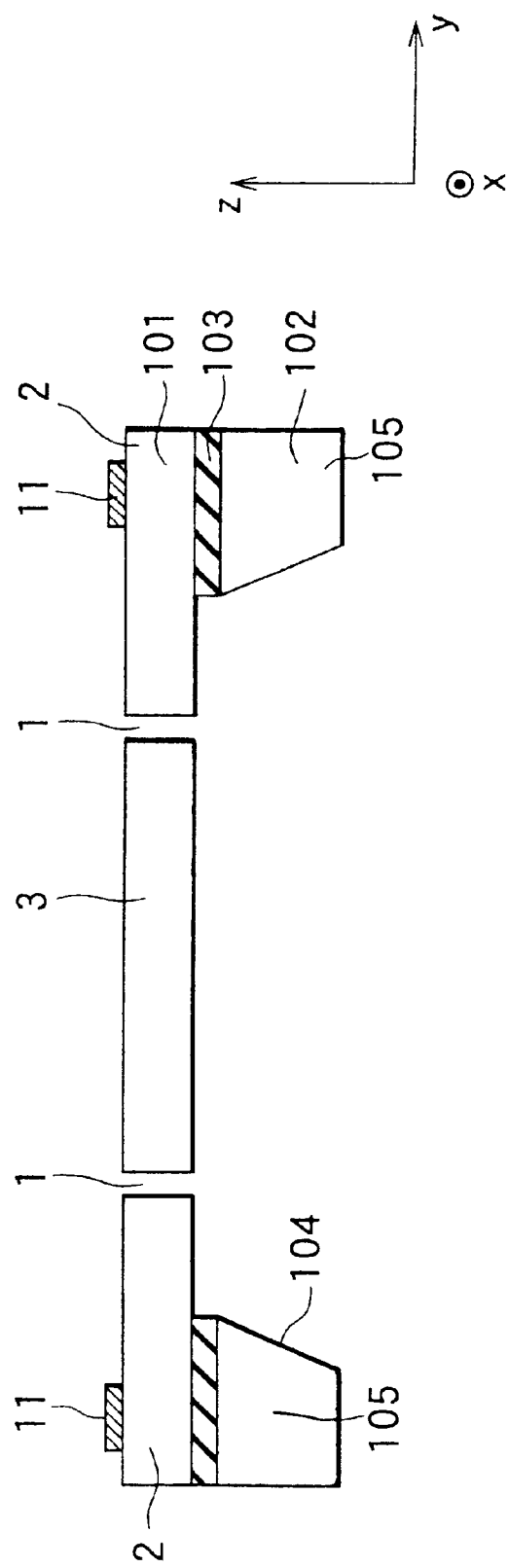

ANGULAR VELOCITY SENSOR CAPABLE OF PREVENTING UNNECESSARY OSCILLATION

CROSS REFERENCE TO RELATED APPLICATIONS

This application is based upon and claims the benefit of Japanese Patent Applications No. 2000-46793 filed on Feb. 18, 2000, and No. 2000-327504 filed on Oct. 26, 2000, the contents of which are incorporated herein by reference.

BACKGROUND OF THE INVENTION

1. Field of the Invention

The present invention relates to an angular velocity sensor having a weight portion connected to a basal portion via a beam portion so as to detect angular velocity based on the oscillation of the weight portion. The sensor is applicable to an angular velocity sensor unit such as a vehicular control system, a vehicular turn-over detecting system, a navigation system and a blur preventing system of optical devices which need to sense angular velocity.

2. Description of the Related Art

Oscillation type angular velocity sensors formed by processing a semiconductor substrate (SOI substrate and the like) by using micro-machining technology for the purpose of miniaturization and cost reduction have been reported lately. For instance, Japanese Patent Application Laid-Open Nos. Hei. 9-119942, Hei. 6-123632, Hei. 8-220125, Hei. 11-248733 and other have proposed such angular velocity sensors.

These angular velocity sensors have a weight portion (oscillator) that is excited and oscillated in a first direction (driving direction, x-axis direction). When the weight portion is turned about an angular velocity axis (z-axis), Corioli's force is generated at the weight portion in a second direction (detecting direction, y-axis direction) that crosses at right angles with the first direction. This Corioli's force is transmitted to a detecting element having movable and stationary electrodes by a beam portion, i.e., by an oscillation spring. In the detecting element, a capacity between the movable electrode and the stationary electrode changes due to the displacement of the movable electrode, thus detecting an output value of the angular velocity.

When it is supposed that the sensor could be fabricated conforming to its design without any processing error in the beam structure composing the angular velocity sensor, the sensor will operate accurately as described above. However, when the beam portion as the oscillation spring, the driving electrode and others have processing errors (e.g., the thickness of the beam portion is erroneous), the oscillation may leak in the y-axis direction, i.e., in the detecting direction, for instance even if the weight portion should be oscillated only in the x-axis direction during the driving oscillation thereof. In such a case, the capacity of the detecting portion changes even if the angular velocity is zero, causing an error in the output value of the angular velocity.

Accordingly, it has been required to process the prior art sensors as accurately as possible in order to prevent the leak of driving oscillation of the weight portion in the detecting direction (hereinafter referred to as unnecessary oscillation) and the processing precision has determined the performance of the sensor. However, the processing error is inevitable in the angular velocity sensor that is formed by processing the semiconductor substrate, and there is a limit in the reduction of the unnecessary oscillation.

SUMMARY OF THE INVENTION

The present invention has been made in view of the above problems. An object of the present invention is, in an oscillation type angular velocity sensor having a weight portion, to reduce an error in output value of angular velocity by eliminating leak (unnecessary oscillation) of oscillation of the weight portion in a detecting direction caused by a processing error.

According to the present invention, briefly, an angular velocity sensor has a weight portion that can be drive-oscillated in a first direction, and can be oscillated in a second direction when an angular velocity is applied around an angular velocity axis, vertical to the first and second directions, in state where the weight portion is drive-oscillated. The angular velocity sensor further has unnecessary oscillation suppressing means for applying an external force to the weight portion in the second direction to prevent the weight portion from being drive-oscillated in a direction other than the first direction.

Thus, in the angular velocity sensor of the invention, the unnecessary oscillation suppressing means applies the external force to the weigh portion in the second direction, and cancels an oscillation component in the second direction that causes unnecessary oscillation in the driving oscillation. As a result, the weight portion can be drive-oscillated only in the first direction even when a beam portion has a processing error. No leak of oscillation of the weight portion occurs in the second (detecting) direction, and an error in output value of the sensor can be lowered.

BRIEF DESCRIPTION OF THE DRAWINGS

Other objects and features of the present invention will become more readily apparent from a better understanding of the preferred embodiments described below with reference to the following drawings, in which;

FIG. 1 is a plan view showing an angular velocity sensor in a first embodiment of the invention;

FIG. 2 is a cross-sectional view taken along line II—II in FIG. 1;

Figure 3A:
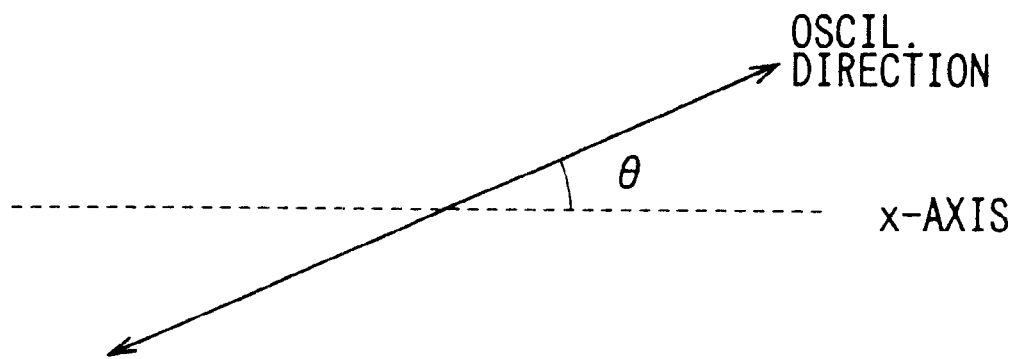
FIGS. 3A and 3B are explanatory views showing a state where unnecessary oscillation occurs and a state where the unnecessary oscillation is suppressed.

DETAILED DESCRIPTION OF THE PREFERRED EMBODIMENTS (First Embodiment)

An angular velocity sensor 100 of a first embodiment will be explained below with reference to FIGS. 1 and 2. It is noted that the same or corresponding parts in each embodiment described below will be denoted by the same reference numerals throughout the following drawings. The angular velocity sensor 100 is a chip manufactured by micromachine processing using the known semiconductor manufacturing technology.

The angular velocity sensor 100 is composed of a substrate (SOI substrate or the like) in which a first semiconductor substrate (silicon substrate or the like) 101 and a second semiconductor substrate (silicon substrate or the like) 102 are bonded via an insulating film layer (silicon oxide film or the like) 103. An opening 104 and a pedestal portion 105 are formed by removing the second semiconductor substrate 102 and the insulating film layer 103 by means of anisotropic etching or the like and the first semiconductor substrate 101 is formed in a diaphragm shape in correspondence to the opening 104.

Trenches 1 are formed in the first semiconductor substrate 101 and defines a movable portion, a stationary portion and respective electrodes thereof which are electrically isolated from each other. The angular velocity sensor 100 has a rectangular weight portion 3 being the movable portion parted by the trenches 1 within a basal portion 2 being the stationary portion. The weight portion 3 is connected to the basal portion 2 through four beam portions 4 provided respectively at the four corners thereof.

Each of the beam portions 4 is formed into a letter "L" such that it bends at right angles and has a degree of freedom both in the driving direction x (x-axis direction, first direction) and in the detecting direction y (y-axis direction, second direction). Accordingly, the beam portions 4 support the weight portion 3 so that the weight portion 3 can be displaced in the driving direction x and in the detecting direction y which cross at right angles from each other within a horizontal plane vertical to the angular velocity axis z. The weight portion 3 can oscillate in both the directions x, y.

Comb-teeth electrodes 5, 6, 7, 8, 7a, 8a, 9, 10, 9a and 10a which protrude like a comb from each side are formed at the right and left sides of the weight portion 3 and the respective sides of the basal portion 2 facing them via the trenches 1. Driving electrodes (means for drive-oscillating the weight portion 3) 5, 6 for drive-oscillating (driving to oscillate) the weight portion 3 in the driving direction x are formed at the center of the weight portion 3.

In the driving electrodes 5, 6, the driving movable electrode 5 at the side of the weight portion 3 and the driving stationary electrode 6 at the side of the basal portion 2 are disposed so that their respective comb teeth are arranged at equal intervals from each other. When a predetermined AC voltage is applied to both the driving electrodes 5, 6 to generate electrostatic force, the weight portion 3 can be drive-oscillated (driven to be oscillated) in the driving direction x by the elasticity of the beam portions 4.

Unnecessary oscillation suppressing electrodes 7, 8, 7a and 8a, which function not only as unnecessary oscillation suppressing means but also as electrostatic force generating means for generating electrostatic force as external force that is to be applied to the weight portion 3, are formed on both the sides of the driving electrodes 5, 6 (on both the upper and lower sides in FIG. 1) at the right and left sides of the weight portion 3.

The unnecessary oscillation suppressing electrodes includes unnecessary oscillation suppressing movable electrodes (weight portion side comb-teeth electrodes) 7, 7a provided at the side of the weight portion 3 and unnecessary oscillation suppressing stationary electrodes (basal portion side comb-teeth electrodes) 8, 8a provided at the side of the basal portion 2. The unnecessary oscillation suppressing movable electrodes 7, 7a, and the unnecessary oscillation suppressing stationary electrodes 8, 8a attract (approach) each other due to electrostatic force that is generated by a predetermined DC or AC voltage applied across the movable electrodes 7, 7a, and the stationary electrodes 8, 8a.

Accordingly, the unnecessary oscillation (displacement) in the detecting direction (y-axis direction) of the weight portion 3 can be suppressed in the driving oscillation thereof. Here, the unnecessary oscillation suppressing movable electrodes 7, 7a are positioned eccentrically so that they are closer to either one of the neighboring unnecessary oscillation suppressing stationary electrodes 8, 8a rather than the center of the gap of the unnecessary oscillation suppressing stationary electrodes 8, 8a neighboring at both the sides of them.

When a first pair of the unnecessary oscillation suppressing electrodes 7, 8 and a second pair of unnecessary oscillation suppressing electrodes 7a, 8a located on the left side of the weight portion 3 in FIG. 1 are compared, the deviating directions of the movable electrodes 7, 7a at the center of the gap of the stationary electrodes 8, 8a adjacent thereto are opposite to each other in the first pair of the unnecessary oscillation suppressing electrodes 7, 8 and in the second pair of the unnecessary oscillation suppressing electrodes 7a, 8a. This is the same at the right side of the weight portion 3. Thus, the displacement suppressing directions, with respect to the weight portion 3, in the first pair of the unnecessary oscillation suppressing electrodes 7, 8 and in the second pair of the unnecessary oscillation suppressing electrodes 7a, 8a are opposite to each other in the detecting direction y.

For instance, in case of the first pair of the unnecessary oscillation suppressing electrodes 7, 8 and the second pair of the unnecessary oscillation suppressing electrodes 7a, 8a located on the left side of the weight portion 3, the movable electrode 7 is attracted downward along the detecting direction y in the first pair of the unnecessary oscillation suppressing electrodes 7, 8 when the electrostatic force is generated. On the other hand, the movable electrode 7a is attracted upward along the detecting direction y in the second pair of the unnecessary oscillation suppressing electrodes 7a, 8a. Therefore, the first pair of the unnecessary oscillation suppressing electrodes 7, 8 and the second pair of the unnecessary oscillation suppressing electrodes 7a, 8a can be properly (selectively) used corresponding to the orientation in the detecting direction y of the unnecessary oscillation of the weight portion 3.

Angular velocity detecting electrodes (angular velocity detecting means) 9, 10, 9a and 10a are formed on both the sides (both up and down sides in FIG. 1) of the driving electrodes 5, 6 and the unnecessary oscillation suppressing electrodes 7, 8, 7a, and 8a, and on the left and right sides of the weight portion 3. The angular velocity detecting electrode can detect angular velocity by a change of electrostatic capacity caused by displacement (displacement of the weight portion 3 in the detecting direction y) of the opposed gap between the angular velocity detecting movable electrodes 9, 9a on side of the weight portion 3 and the angular velocity detecting stationary electrodes 10, 10a on the side of the basal portion 2.

The respective driving, unnecessary oscillation suppressing and angular velocity detecting comb-teeth electrodes described above are electrically independent of one another and are respectively connected to electrode pads 11 formed on the basal portion 2 by, for instance, evaporating aluminum. Each pad 11 is electrically connected to an external circuit not shown by wire bonding or the like and is capable of independently controlling the potential of each comb-teeth electrode.

Next, the operation of the present embodiment will be explained based on the structure of the angular velocity sensor 100 described above. Basically, the angular velocity sensor 100 detects angular velocity based on the oscillation of the weight portion 3 in the detecting direction y which occurs when the angular velocity is applied around the angular velocity axis z while drive-oscillating the weight portion 3 in the driving direction x.

A rectangular wave or sine wave voltage signal (driving signal) is applied to the driving movable electrode 5 by the above-mentioned external circuit not shown. Then, the weight portion 3 performs driving oscillation along the driving direction x that is allowed by the degree of freedom of the beam portions 4 in the driving direction x. Because the sensitivity of the angular velocity sensor is almost proportional to the amplitude of the driving oscillation, resonance drive (driving method in which frequency of driving voltage is made to coincide with intrinsic oscillation of an oscillation system), which may enlarge the driving amplitude, is often used.

When the resonance drive is performed, the amplitude is proportional to a value Q of the driving oscillation. The value Q in gas is determined mainly by a coefficient of viscosity of the gas, and the greater the coefficient of viscosity is, the smaller the value Q becomes in general. Further, the smaller the pressure of the gas is, the smaller the coefficient of viscosity becomes in the gas. Therefore, the smaller the pressure of the gas is, the better the sensitivity of the angular velocity sensor becomes in case of the resonance drive. Accordingly, the sensitivity of the angular velocity sensor can be enhanced by devising a vacuum package or the like.

However, non-resonance oscillation is used intentionally in the air in the present embodiment by taking preference of reducing the production cost over the enhancement of the sensor sensitivity. It is needless to say that the present embodiment is effective for the resonance drive. Here, because the driving amplitude has a temperature dependency (mainly due to the temperature dependency of the coefficient of viscosity of gas), a control called Auto Gain Control (AGC) is often used. Here, the AGC will be explained briefly.

For instance, in case of the angular velocity sensor 100 described above, the driving electrodes 5, 6 on the right side, among the driving electrodes 5, 6 provided on the right and left sides of the weight portion 3, are used as oscillation monitoring electrodes for monitoring the physical quantities (driving amplitude, driving speed and others) of the driving oscillation in the weight portion 3. In this case, the driving movable electrode 5 on the side of the weight portion 3 functions as an oscillation monitoring movable electrode and the driving stationary electrode 6 on the side of the basal portion 2 function as an oscillation monitoring stationary electrode. Accordingly, only the driving electrodes 5, 6 on the left side generate the driving force when the driving signal is applied.

When the weight portion 3 is displaced in the driving direction x by the driving oscillation thereof, an overlap length of the oscillation monitoring electrodes 5, 6 is changed. Accordingly, the electrostatic capacity between the oscillation monitoring electrodes 5, 6 is changed. The above-described external circuit converts the change in electrostatic capacity into a change in voltage to monitor the physical quantities (driving amplitude, driving speed and others) of the driving oscillation.

For instance, the control of fixing the driving amplitude by applying feedback (by conducting negative feedback) to the driving voltage based on the amplitude (driving amplitude) of the driving oscillation obtained as a result of the above-mentioned monitoring is the AGC. The use of the AGC is advantageous because it can remove the temperature dependency of the driving amplitude and can suppress the temperature drift of the sensitivity. It is not necessary to use the AGC all the time when it is not required so much to suppress the temperature drift of the sensitivity.

It is noted that a strain gage and an electromagnetic detection for detecting a change in magnetic flux penetrating a wiring member may be used in addition to the oscillation monitoring electrodes 5, 6, i.e., the comb-teeth electrodes, as means for monitoring the oscillation. In case of using the strain gauge, for instance, a piezoelectric element is provided on the beam portion 4 and monitors the driving oscillation by the degree of distortion of the beam portion 4. In case of using the electromagnetic detection, for instance, a wiring member is formed on the weight portion 3 via the beam portion 4, and a magnet provided above the wiring member monitors the change in magnetic flux penetrating the wiring member.

Then, when angular velocity around the angular velocity axis z vertical to the substrate plane (substrate plane of the first semiconductor substrate 101) is added to the weight portion 3 which is drive-oscillated linearly along the driving direction x, Coriolli's force Fc=2 mvΩ (m: mass of the weight portion 3, v: velocity of driving oscillation, Ω: angular velocity) acts in the detecting direction y. When the Coriolli's force Fc acts on the weight portion 3, the weight portion 3 oscillates in the detecting direction y due to the degree of freedom of the beam portions 4 in the detecting direction y.

The sensitivity of the angular velocity sensor may be enhanced significantly by making the intrinsic oscillation frequency in the detecting direction y coincide with the intrinsic oscillation frequency in the driving direction x and by resonantly driving it (di-resonance). The sensitivity of the angular velocity sensor may be also enhanced significantly by making the frequency of the driving voltage coincide with the intrinsic oscillation frequency in the detecting direction y without resonantly driving it. It is not necessary to always devise as described above.

If the electrostatic capacity of the detecting electrodes 9, 10 becomes C0+ΔC, the electrostatic capacity of the detecting electrodes 9a, 10a becomes C0-ΔC (C0: initial capacity, ΔC: change in capacity by the Corioli's force). Here, because ΔC Fc Ω, and ΔC is proportional to the angular velocity Ω, it is possible to detect the angular velocity Ω by differentially detecting the capacities of the detecting electrode 9, 10 and the detecting electrodes 9a, 10a.

Figure 3B:
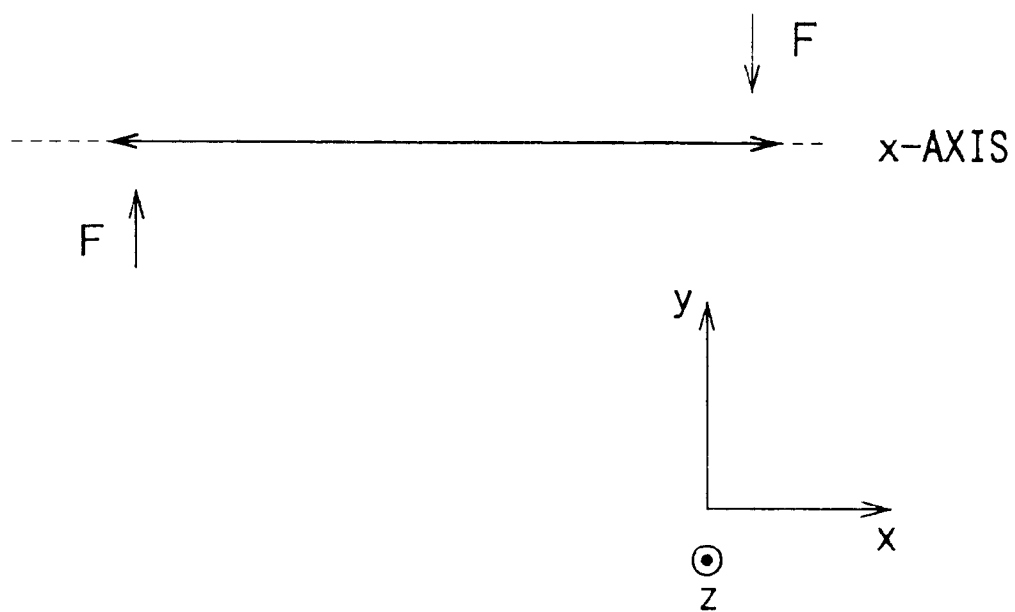

FIGS. 3 and 4 are explanatory graphs showing the operation of the suppression of unnecessary oscillation using the unnecessary oscillation suppressing electrodes 7, 8, 7a and 8a which are unnecessary oscillation suppressing means of the present embodiment. When there is a processing error (processing error of the beam portion 4 in particular) in the angular velocity sensor 100, as shown in FIG. 3A, the direction of driving oscillation is not parallel with the driving direction x and deviates obliquely by an angle θ from the driving direction x with an oscillation component in the detecting direction y. Because the oblique oscillation causes noise, it is desirable to cancel that and to set as shown in FIG. 3B.

In order to cancel the oblique oscillation, the following method is taken in the present embodiment. It is supposed that the driving oscillation is oblique as shown in FIG. 3A (this is called as unnecessary oscillation). The angle of deviation θ of the unnecessary oscillation from the driving direction x (x-axis direction) is measured in advance by experiments or the like before shipping the sensor. Then, DC voltage V is applied across the second pair of the unnecessary oscillation suppressing electrodes 7a, 8a.

As shown in FIG. 3B, then, the weight portion 3 receives electrostatic force F in the detecting direction y (y-axis direction) (that is, in the direction in which the direction of the driving oscillation is corrected), and the direction of the driving oscillation can be corrected by setting an appropriate value to the value of the DC voltage V described above.

Figure 4A:
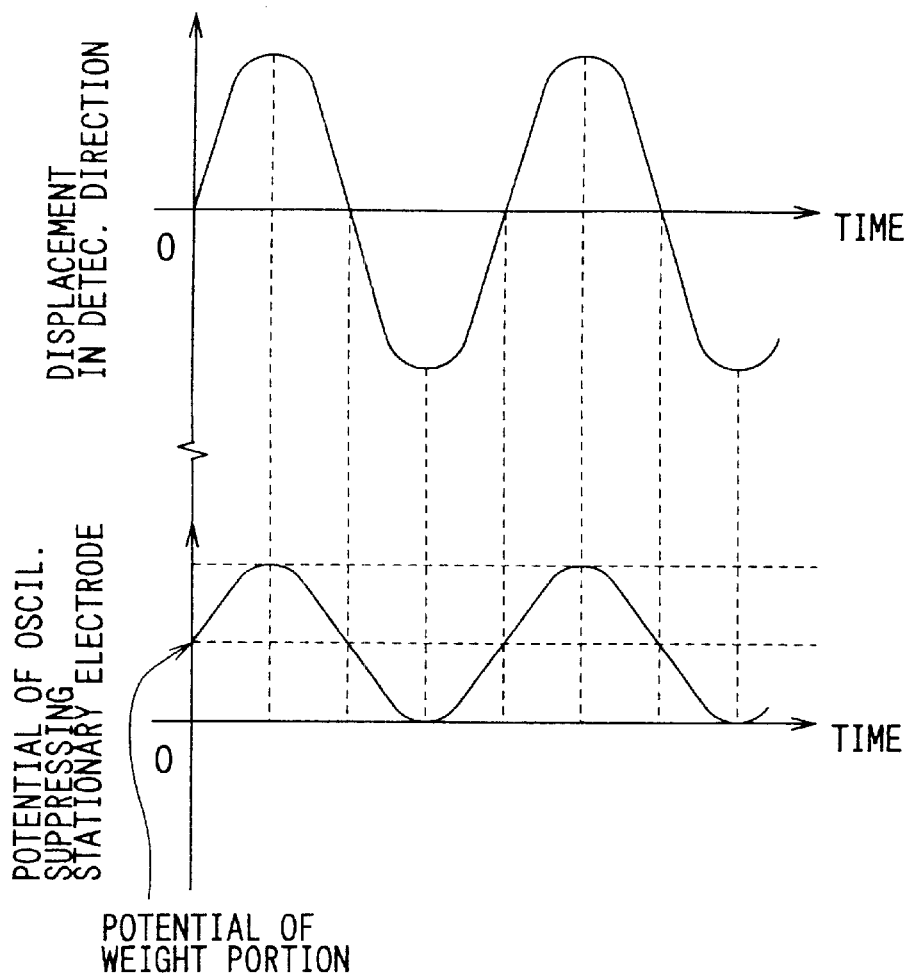
FIGS. 4A and 4B are graphs for explaining a case where AC voltage is applied to unnecessary oscillation suppressing electrodes in the first embodiment.

It is also possible to apply not the DC voltage described above but AC voltage having the same frequency with the driving frequency as shown in FIG. 4, as a method for correcting the driving oscillation direction. When the unnecessary oscillation occurs as shown in FIG. 3A, the weight portion 3 (driving movable electrode 5) is displaced periodically in the detecting direction y (y-axis direction) as shown in FIG. 4A. The AC voltage is applied across the second pair of the unnecessary oscillation suppressing electrodes 7a, 8a in accordance to the period of the displacement. This method is advantageous because the electrostatic force is maximized at the maximum displacement of unnecessary oscillation.

Figure 4B:
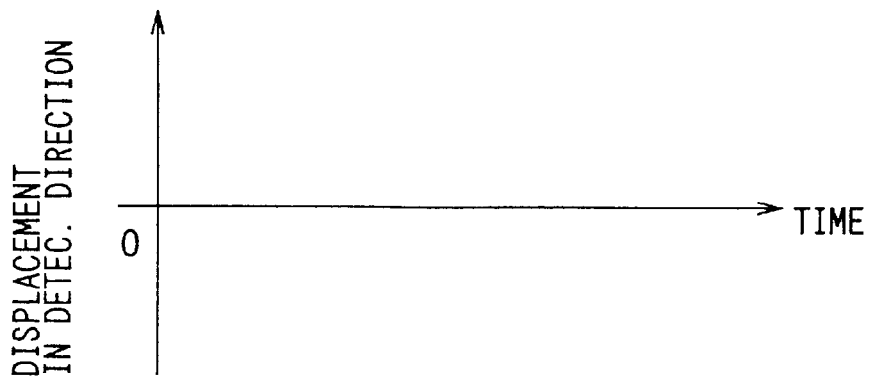

As a result, as shown in FIG. 4B, the unnecessary oscillation is eliminated. When the direction of the unnecessary oscillation (oblique oscillation) leaks in the opposite direction from that of FIG. 3A (for instance, when the angle of deviation is −θ in FIG. 3A), the DC or AC voltage may be applied across the first pair of unnecessary oscillation suppressing electrodes 7, 8 this time in the same manner as described above. The potential of the unnecessary oscillation suppressing stationary electrode 8 or 8a not used in the first and second pairs of the unnecessary oscillation suppressing electrodes is equalized with that of the unnecessary oscillation suppressing movable electrodes 7, 7a.

According to the present embodiment, the first pair of the unnecessary oscillation suppressing electrodes 7, 8 and the second pair of the unnecessary oscillation suppressing electrodes 7a, 8a are provided by four each. Although they are one set by four and it is most simple and advantageous to control them in the same way, they may be controlled separately. Further, although the unnecessary oscillation suppressing electrodes are provided at both the sides of the driving electrodes sandwiched therebetween, they may be provided only at one side. However, it is preferable to dispose as shown in the figure from the aspect of symmetry. Although FIG. 4A shows the sine wave, the wave may be a rectangular wave.

It is required to finish these adjustments related to the suppression of unnecessary oscillation before the sensor is shipped off. That is, the external circuit not shown should be adjusted before the shipping so that the DC or AC voltage for suppressing the unnecessary oscillation is applied to the first pair of the unnecessary oscillation suppressing electrodes 7, 8 or to the second pair of the unnecessary oscillation suppressing electrodes 7a, 8a during the usage of the sensor.

Figure 5A:
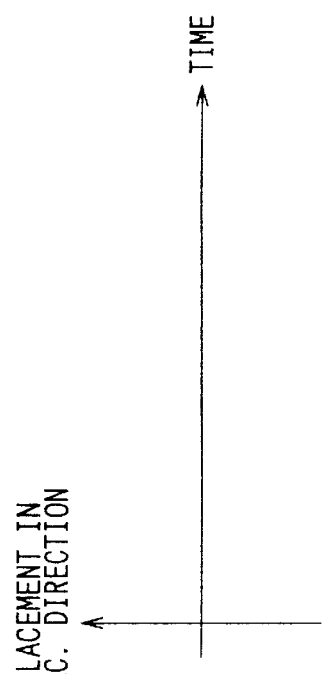
FIGS. 5A to 5D are graphs for explaining effects of unnecessary oscillation suppression with respect to an angular velocity output in the first embodiment.

The effect of the unnecessary oscillation suppressing electrodes 7, 8, 7a and 8a to the angular velocity output value will be explained with reference to FIGS. 5A to 5D. FIG. 5A shows the displacement of the weight portion 3 (driving movable electrode 5) in the detecting direction y (y-axis direction) when unnecessary oscillation exists, the unnecessary oscillation suppressing electrodes 7, 8, 7a and 8a are not used, and angular velocity is zero. The displacement in the detecting direction y causes changes in capacity of the detecting electrodes 9, 10, 9a, and 10a and interferes the detection as noise.

Figure 5C:
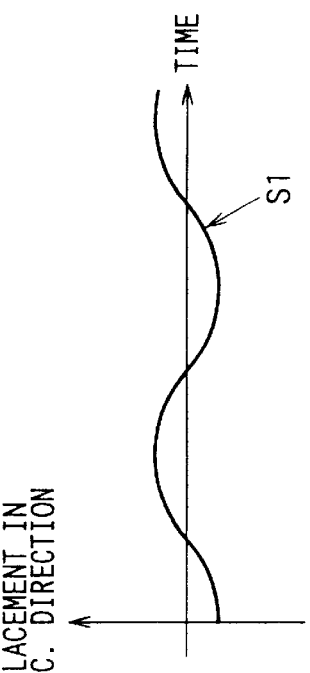
Figure 5B:
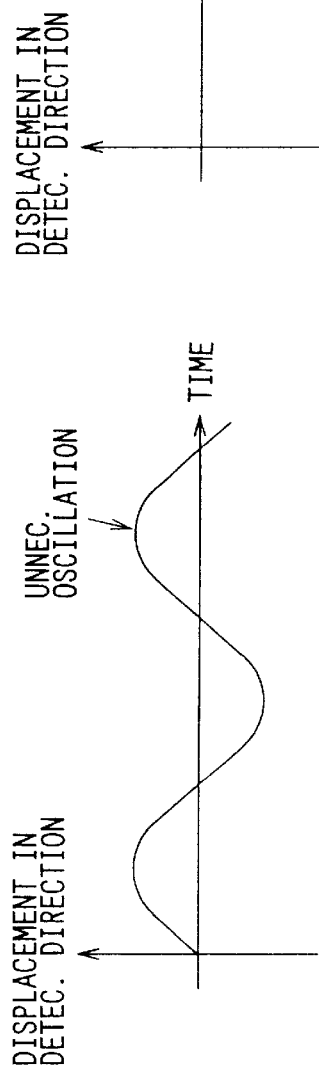

In fact, when the unnecessary oscillation exists and the unnecessary oscillation suppressing electrodes 7, 8, 7a and 8a are not used, as shown in FIG. 5B, an angular velocity signal S1 caused by the angular velocity and a signal S2 caused by the unnecessary oscillation appear mixedly (even though their phases deviate from each other by about 90 degrees) when the angular velocity is applied.

Figure 5D:
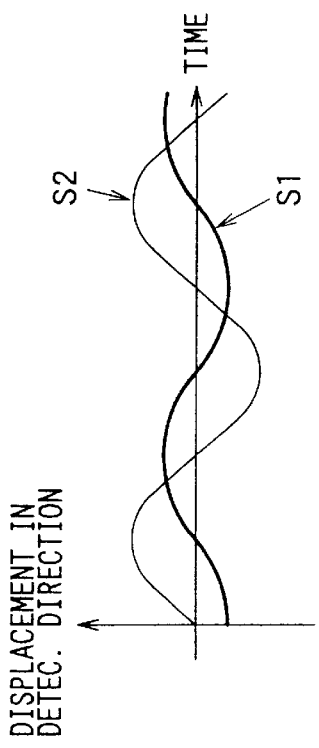

FIGS. 5C and 5D show the cases when the unnecessary oscillation suppressing electrodes 7, 8, 7a and 8a are used in contrary. When there is no angular velocity (see FIG. 5C), no displacement occurs in the detecting direction y, and there is no output. However, when the angular velocity is applied (see FIG. 5D), it is possible to detect only the angular velocity signal S1, thereby realizing ideal detection of the angular velocity.

As described above, according to the present embodiment, the unnecessary oscillation suppressing means 7, 8, 7a and 8a can cancel the oscillation component of the weight portion 3 in the detecting direction y, which is the unnecessary oscillation component in the driving oscillation in the driving direction x, by applying the external force to the weight portion 3 in the detecting direction y. As a result, it is possible to suppress the unnecessary oscillation of the weight portion 3 in the direction other than the driving direction x and to drive and oscillate the weight portion 3 favorably only in the driving direction x.

It is also possible to reduce the error of the angular velocity output value by eliminating the leak of the driving oscillation of the weight portion 3 in the detecting direction y caused by the processing error of the beam portions 4 and others. The reduction of the error of the angular velocity output value is connected to the reduction of the temperature change at the zero point of the angular velocity output value.

The present embodiment is also characterized in that one that generates the electrostatic force as the external force to be applied to the weight portion 3 is used as the unnecessary oscillation suppressing means. The present embodiment is provided with the unnecessary oscillation suppressing stationary electrodes (basal portion side comb-teeth electrodes) 8, 8a protruding comb-likely from the basal portion 2 and the unnecessary oscillation suppressing movable electrodes (weight portion side comb-teeth electrodes) 7, 7a protruding comb-likely from the weight portion 3 so as to bite in the gaps of the stationary electrodes 8, 8a, and the electrostatic force is produced between these electrodes.

The unnecessary oscillation suppressing electrodes 7 and others in the present embodiment can be fabricated readily by using the micro-machining technology for manufacturing the angular velocity sensor 100, which simplifies the manufacturing process, requires less number of parts and enables the miniaturization. The comb structure such as the unnecessary oscillation suppressing electrodes in the present embodiment is advantageous in that it allows a very large electrostatic force to be generated per unit area of the chip composing the sensor and it requires less voltage accordingly.

Further, on both sides of the respective unnecessary oscillation suppressing electrodes 7, 7a, the basal portion side comb-teeth electrodes 8, 8a are disposed to define a gap therebetween, and the respective comb-teeth electrodes 7, 7a are positioned so that they come closer to either one of the adjacent basal portion side comb-teeth electrodes 8, 8a rather than the center of the gap. Therefore, each of the basal portion side comb-teeth electrodes 7, 7a which are the movable electrode is attracted to the closer one of the basal portion side comb-teeth electrodes 8, 8a which are the stationary electrodes by the electrostatic force. As a result, it is possible to change the oscillation direction of the weight portion 3 readily to the normal state.

Also, in the present embodiment, the driving electrodes 5, 6, which are the comb-teeth electrodes, are used as means (driving means) for drive-oscillating the weight portion 3, and generate an electrostatic force between the weight portion 3 and the basal portion 2. The weight portion 3 is driven so as to oscillate by the electrostatic force. Therefore, as compared to electromagnetic driving and piezoelectric driving, the electrostatic driving using the electrostatic force simplifies the process, requires less number of parts and enables the miniaturization.

Figure 6:
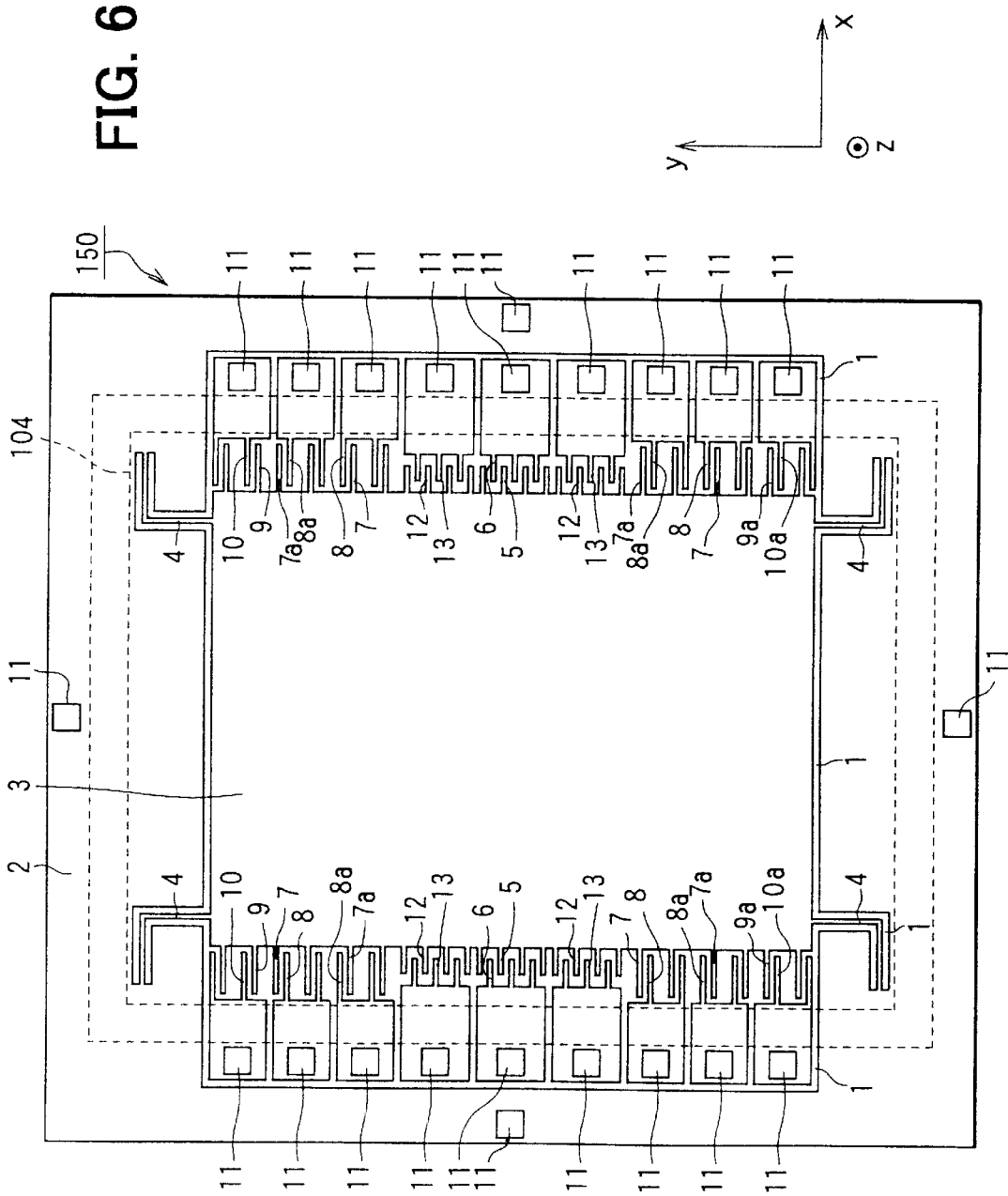
FIG. 6 is a plan view showing an angular velocity sensor as another example of the first embodiment.

FIG. 6 shows another example of the angular velocity sensor of the present embodiment. Although an angular velocity sensor 150 shown in FIG. 6 has basically the same structure as that of the angular velocity sensor 100 shown in FIG. 1, it is different in that oscillation monitoring electrodes 12, 13 for monitoring a physical quantity of driving oscillation are formed additionally.

In the angular velocity sensor 100 shown in FIG. 1, no oscillation monitoring electrode is provided specifically and either ones of the driving electrodes 5, 6 provided at the right and left sides of the weight portion 3 (e.g., the right side driving electrodes 5, 6) are used as the oscillation monitoring electrodes. Therefore, the driving force is applied to the weight portion 3 only at the left side in the angular velocity sensor 100 shown in FIG. 1.

On the other hand, in the angular velocity sensor 150 shown in FIG. 6, the weight portion 3 is driven from both the right and left sides. This is considered to be advantageous in the aspects of the symmetry and of the magnitude of the driving amplitude. For instance, when the driving voltage is equal, the driving amplitude obtained in the sensor 150 shown in FIG. 6 should be able to about twice as compared to that shown in FIG. 1. The other effects of the angular velocity sensor 150 are the same as those described above.

(Second Embodiment)

Figure 7:
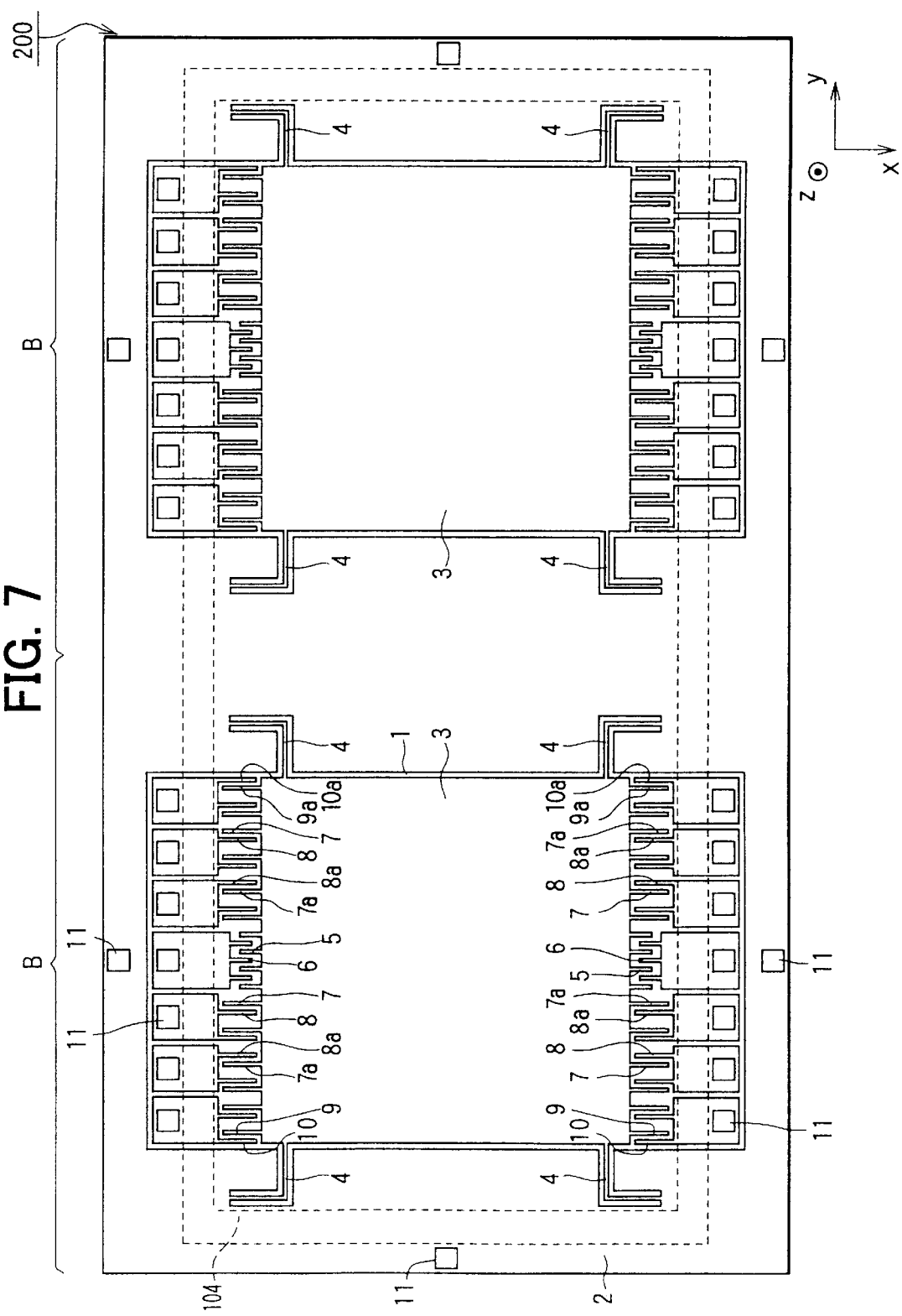
FIG. 7 is a plan view showing an angular velocity sensor in a second embodiment of the invention.
Figure 8:
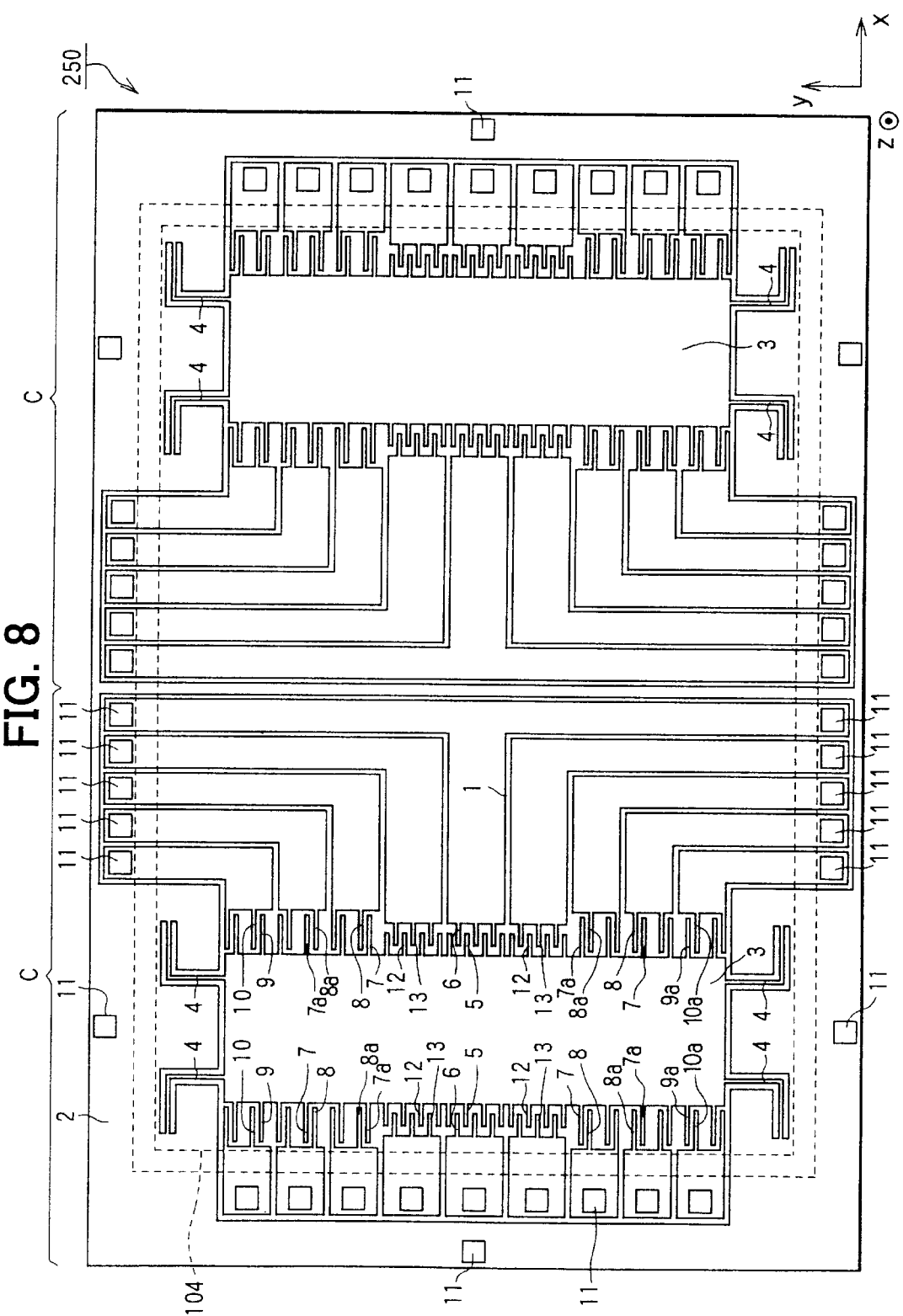
FIG. 8 is a plan view showing an angular velocity sensor as another example of the second embodiment.

Next, a second embodiment will be explained by aiming mainly at the differences from the first embodiment. FIG. 7 shows an angular velocity sensor 200 of the present embodiment and FIG. 8 shows an angular velocity sensor 250 as another example of the present embodiment. Although there is one weight portion 3 in the first embodiment described above, the present embodiment is different from the first embodiment mainly in that a plurality of weight portions 3, each of which is almost the same, are formed (two in this embodiment).

The angular velocity sensor 200 in FIG. 7 includes two parts B, each of which corresponds to the angular velocity sensor 100 shown in FIG. 1, and which are provided in parallel in the y-axis direction. The angular velocity sensor 250 in FIG. 8 includes two parts C, each of which corresponds to the angular velocity sensor 150 shown in FIG. 6, and which are provided in parallel in the x-axis direction. Here, a part of the reference numerals are omitted in FIGS. 7 and 8. The electrode pads 11 are disposed at the outer peripheral part in the angular velocity sensor 250 in FIG. 8, so that the shape of the trenches 1 is changed more or less from that shown in FIG. 6.

Next, the operations of the sensors 200 and 250 of the present embodiment will be explained by aiming mainly at the differences from that of the first embodiment. The operation of each weight portion 3 is substantially the same as that of the first embodiment. However, the merit of the present embodiment will be exhibited specifically when the weight portions 3 are drive-oscillated so that the phases of the driving oscillations are opposite to each other in the relationship of the respective weight portions 3. This is because the disturbance acceleration can be canceled by reversing the phases of the driving oscillations. This point will be explained in detail below.

First, both the weight portions 3 are drive-oscillated along the driving direction x in the phases opposite to each other. In case of the sensor having one weight portion 3, because the intervals of the detecting electrodes 9, 10, 9a, and 10a change when acceleration (disturbance acceleration) is added from the outside in the same direction as the Corioli's force, the acceleration may cause noise. That is, even if angular velocity is zero, it seems as if the angular velocity is generated.

However, in the present embodiment, the angular velocity signals from the two weight portions 3, which are drive-oscillated in the phases opposite to each other, are in anti-phase each other, while the signals caused by the disturbance acceleration are in in-phase each other. Therefore, the influence of the disturbance acceleration can be removed by subtraction (taking the difference) of the outputs of the two weight portions 3. The present embodiment also has a merit that the sensitivity is doubled as compared to the first embodiment. It is also possible to measure the acceleration by addition (taking the sum) of the outputs of the two weight portions 3. Thus, it is possible to realize a sensor that can measure both the acceleration and angular velocity by processing the signals.

The several weight portions 3 may be disposed independently of one another without being connected. Accordingly, the arrangement of the weight portions 3 becomes free and the sensor may be miniaturized as a whole. It simply lowers the cost and improves the yield. Although the two weight portions 3 are formed on the same chip in the example shown in the figure, it is also possible to dispose each of the weight portions 3 on separate chips, respectively. It also contributes to the improvement of the yield.

When the several weight portions 3 are not connected to each other, it is not necessary to provide a beam for connecting the weight portions 3. Therefore, several driving electrodes 5, 6 can be attached easily around the individual weight portion 3 as the driving means. In the example shown in the figure, two sets of the comb-like driving electrodes 5, 6 are formed at both the upper and lower sides of the individual weight portion 3 to enlarge the driving force. For instance, when the two weight portions 3 are connected to each other by a beam 20 as in a third embodiment described next, the driving electrodes 5, 6 are provided only at one side of the weight portion 3 because the beam becomes an obstacle.

(Third Embodiment)

Next, the third embodiment will be explained by aiming mainly at the differences from the first embodiment. The present embodiment is modified from the second embodiment and is characterized in that at least two weight portions are connected by at least one connection beam.

Figure 9:
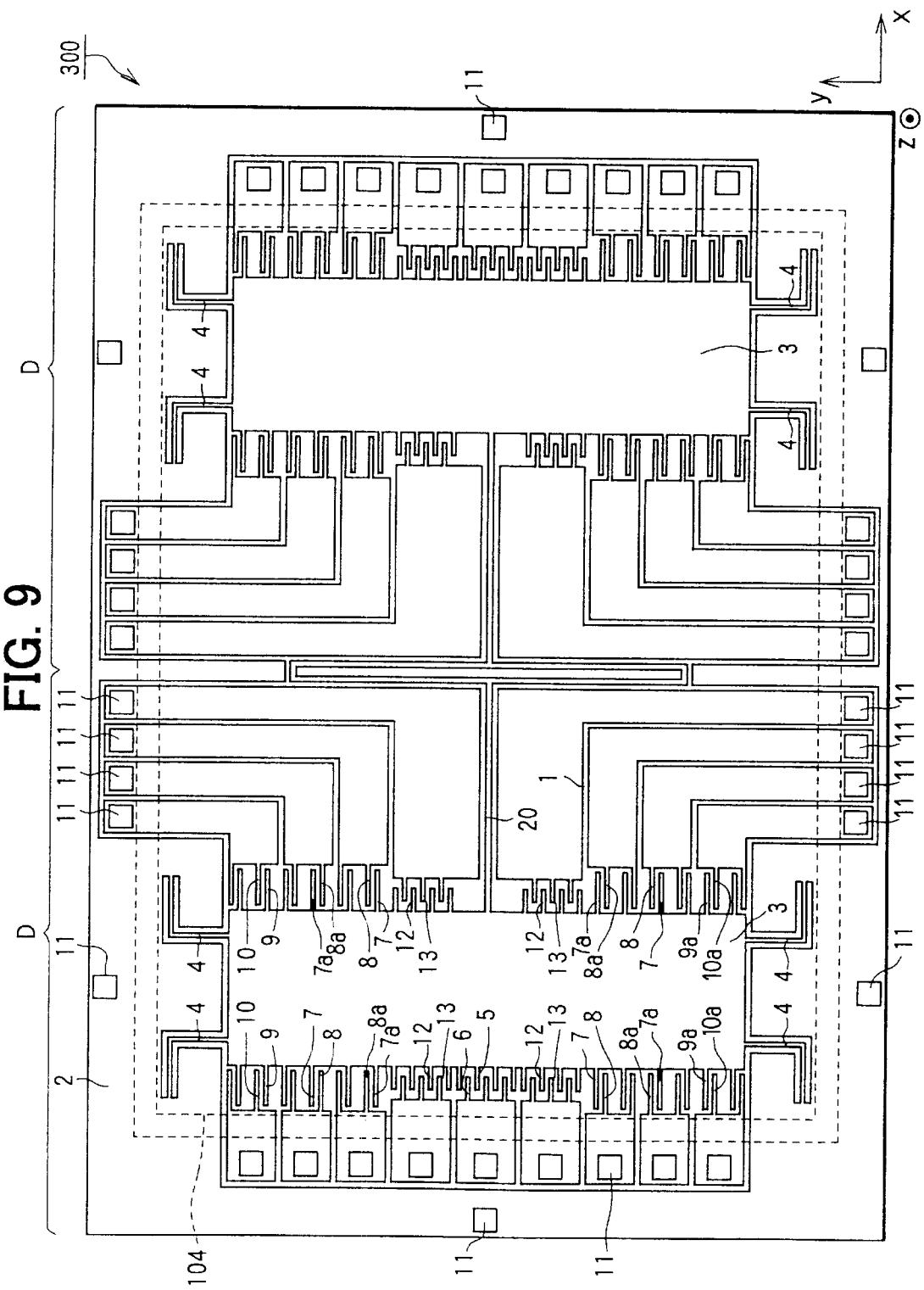
FIG. 9 is a plan view showing an angular velocity sensor in a third embodiment of the invention.

FIG. 9 shows an angular velocity sensor 300 of the present embodiment having two weight portions 3 similarly to the angular velocity sensor 250 shown in FIG. 8. However, unlike the angular velocity sensor 250, there is no inner side driving electrodes 5, 6 (the right side of the left weight portion 3 and the left side of the right weight portion 3), and the two weight portions 3 are connected by the connection beam (coupled beam) 20 that is capable of displacing the two weight portions 3 in both the driving direction x and the detecting direction y. The sensor 300 has a shape in which two parts D having the same shape are arranged on the right and left sides.

Next, the operation of the present embodiment will be explained mainly focusing on the differences from the second embodiment. The operation of oscillating the weight portions 3 in-phase or in anti-phase is the same as the second embodiment. The following points are also the same as the second embodiment.

That is, the influence of the acceleration can be removed by taking the difference of the output signals of the two weight portions 3, the sensitivity is almost doubled as compared to the first embodiment, and the acceleration can be measured by taking the sum of the outputs from the two weight portions 3. Accordingly, the sensor capable of measuring the angular velocity and acceleration at the same time can be realized.

By the way, the present embodiment has the following merits because the connection beam 20 connects the two weight portions 3. The two weight portions 3 form a coupled oscillation system by connecting them by the connection beam 20. Accordingly, even if the right and left sides weight portions 3 and the beam portions 4 and others connected thereto could not be structured symmetrically due to the processing errors or the like, the frequency characteristics of the amplitudes of both the weight portions 3 have peaks (maximum values) at the same frequency (intrinsic frequency).

Therefore, the amplitudes of both the weight portions 3 have closer values to each other when resonance is utilized. By the way, when the connection beam 2 is not provided and there arises a processing error, it is very difficult to bring the amplitudes of the right and left sides weight portions 3 in coincidence with each other because the intrinsic frequencies of both the weight portions 3 do not coincide. Even if the amplitudes can be made to coincide, the amplitude is small because the frequencies deviate from the resonant point. In consequence, the sensitivity is low, which is disadvantageous.

(Fourth Embodiment)

Figure 10:
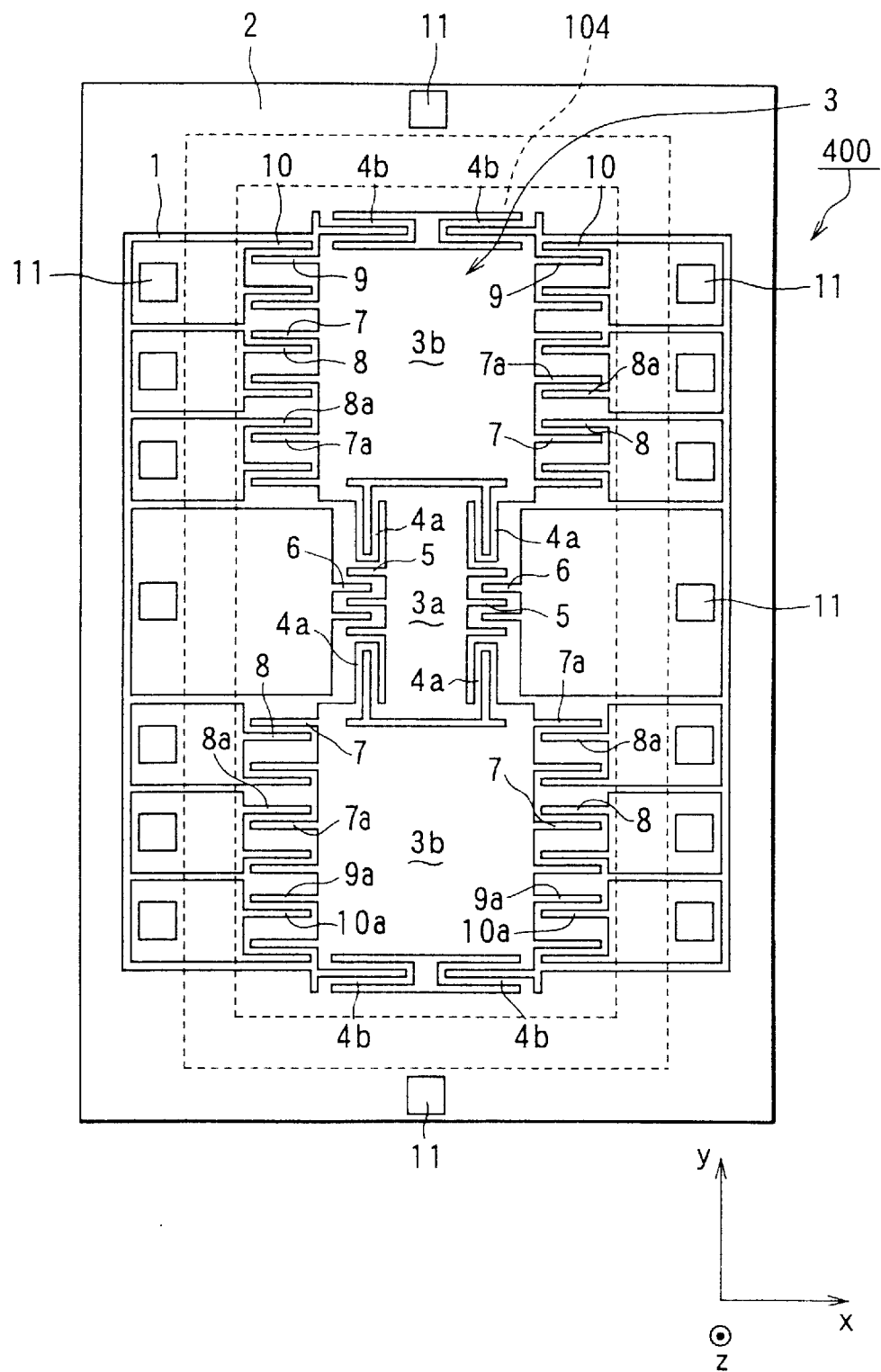
FIG. 10 is a plan view showing an angular velocity sensor in a fourth embodiment of the invention.
Figure 11:
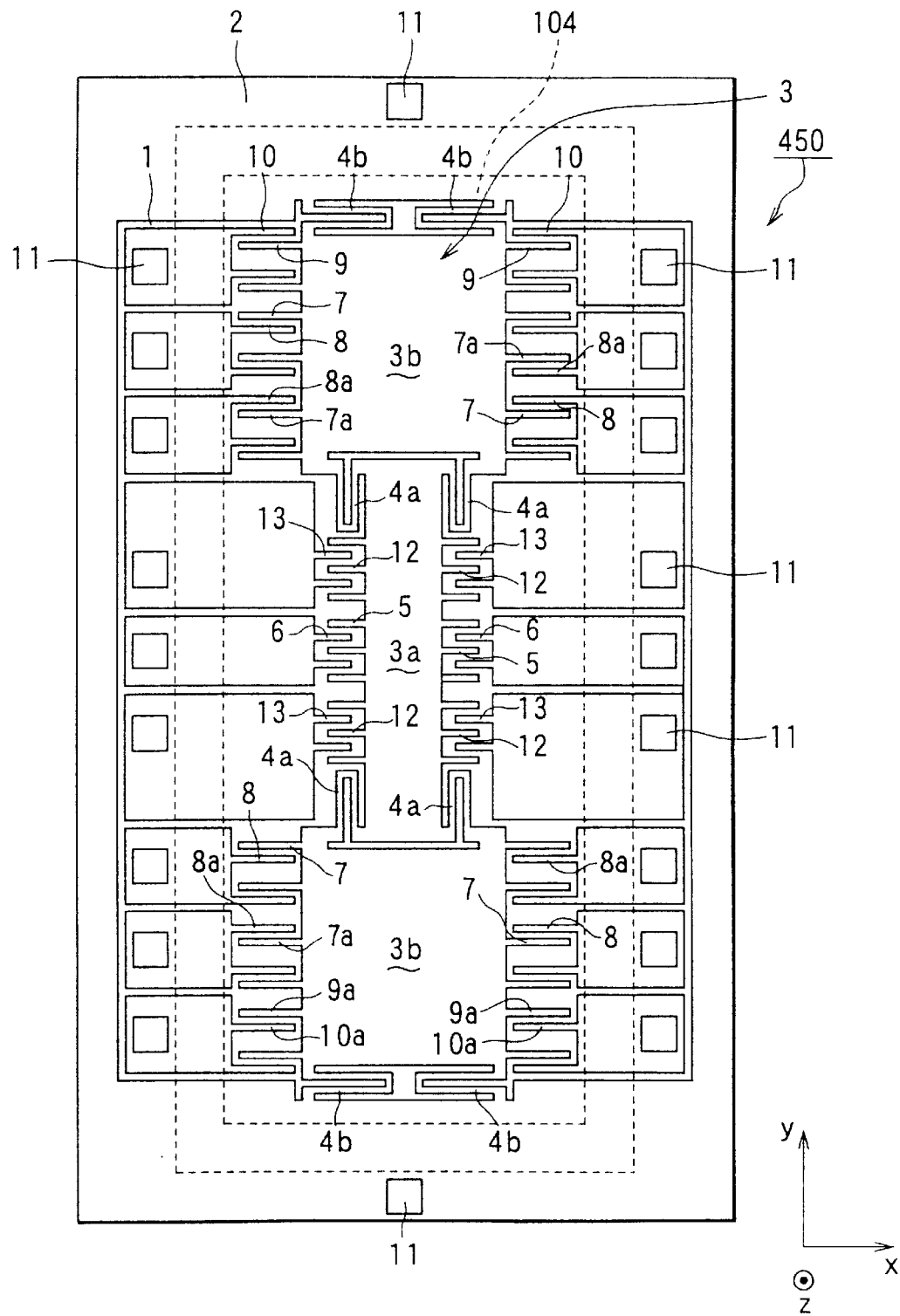
FIG. 11 is a plan view showing an angular velocity sensor as another example of the fourth embodiment.

Next, a fourth embodiment will be explained. The present embodiment is modified from the first embodiment and the differences from the first embodiment will be explained with reference to FIGS. 10 and 11. FIG. 10 shows an angular velocity sensor 400 of the present embodiment and FIG. 11 shows an angular velocity sensor 450 as another example of the present embodiment.

First, the angular velocity sensor 400 shown in FIG. 10 will be explained. The present embodiment is different from the first embodiment in that the weight portion 3 comprises a first weight portion (driving weight portion) 3a capable of drive-oscillating in the driving direction x, and two second weight portions (detecting weight portion) 3b connected to the first weight portion 3a by driving beams 4a and connected to the basal portion 2 by detecting beams 4b.

That is, the first weight portion 3a is connected to the basal portion 2 via the second weight portions 3b by the driving beams 4a. The beam portion of the present invention is composed of the driving beams 4a and the detecting beams 4b in the present embodiment.

It is advantageous to design the four driving beams 4a, connected to the second weight portions 3b, have the degree of freedom only in the driving direction x and the present embodiment is constructed as described above. However, it is not always necessary to construct as such as long as the first weight portion 3a displaces mainly in the driving direction x.

The four unnecessary oscillation suppressing electrodes 7, 8, 7a and 8a and two detecting electrodes 9, 10, 9a and 10a are provided at each of the second weight portions 3b and the basal portion 2 facing thereto. While the second weight portion 3b is connected and fixed to the basal portion 2 by the two detecting beams 4b, these detecting beams 4b are designed so as to have the degree of freedom mainly in the detecting direction y.

Accordingly, the first weight portion 3a can be drive-oscillated in the driving direction x by the voltage applied across the driving movable electrode 5 formed on the first weight portion 3a and the driving stationary electrode 6 formed on the basal portion 2 facing thereto. Then, when angular velocity is applied around the angular velocity axis z during this driving oscillation, both the weight portions 3b are oscillated in the detecting direction y by the detecting beams 4b.

The driving electrodes 5, 6 on one side of the first weight portion 3a may be used as the oscillation monitoring electrodes also in this angular velocity sensor 400. Here, oscillation monitoring electrodes 12, 13 for monitoring the physical quantity of the driving oscillation of the first weight portion 3a may be formed additionally like the angular velocity sensor 450 shown in FIG. 11 which is another example of the present embodiment.

Briefly, the difference between FIGS. 10 and 11 is the same as the difference between FIGS. 1 and 6 in the first embodiment. That is, when the AGC is used, the first weight portion 3a is driven from either one side of the left and right sides in the angular velocity sensor 400 shown in FIG. 10. On the other hand, the first weight portion 3a is driven from both the sides in the angular velocity sensor 450 shown in FIG. 11 and it is considered to be advantageous in the aspects of the symmetry and the magnitude of the driving amplitude.

Next, the operation of the sensor of the present embodiment will be explained. When periodic voltage is applied to the external circuit not shown, the first weight portion 3a is drive-oscillated along the driving direction x due to the degree of freedom of the driving beams 4a in the driving direction x. At this time, because the second weight portions 3b are not drive-oscillated (displaced), the capacities between the detecting electrodes 9, 10, 9a and 10a barely change by the simple driving oscillation. This is one characteristic point of the present embodiment and accordingly, the sensors 400 and 450 of the present embodiment can be attained with less noise and good resolution as compared to the first embodiment.

The resonant driving or non-resonant driving described above may be adopted also in the present embodiment. It is also advantageous to adopt the ACG control because it allows the temperature dependency of the driving amplitude to be removed and the temperature drift of the sensitivity to be suppressed.

When angular velocity is applied around the angular velocity axis z when the first weight portion 3a is drive-oscillated, both the weight portions 3a and 3b oscillate in the detecting direction y due to the degree of freedom of the detecting beams 4b in the detecting direction y. At this time, the angular velocity Ω can be detected by detecting differentially the capacity of the detecting electrodes 9, 10 and the capacity of the detecting electrodes 9a, 10a substantially in the same manner as the first embodiment.

The method for suppressing the unnecessary oscillation caused by the processing error (processing error of the driving beams 4a in particular) in the angular velocity sensors 400 and 450 can be executed by using the unnecessary oscillation suppressing electrodes 7, 8, 7a and 8a similarly to the first embodiment. Accordingly, as explained referring to FIGS. 5A to 5D, no output is outputted when angular velocity is zero and only an angular velocity signal is detected when the angular velocity is applied in the same manner with what described in the first embodiment. Thus, ideal detection of the angular velocity can be performed.

(Fifth Embodiment)

Figure 12:
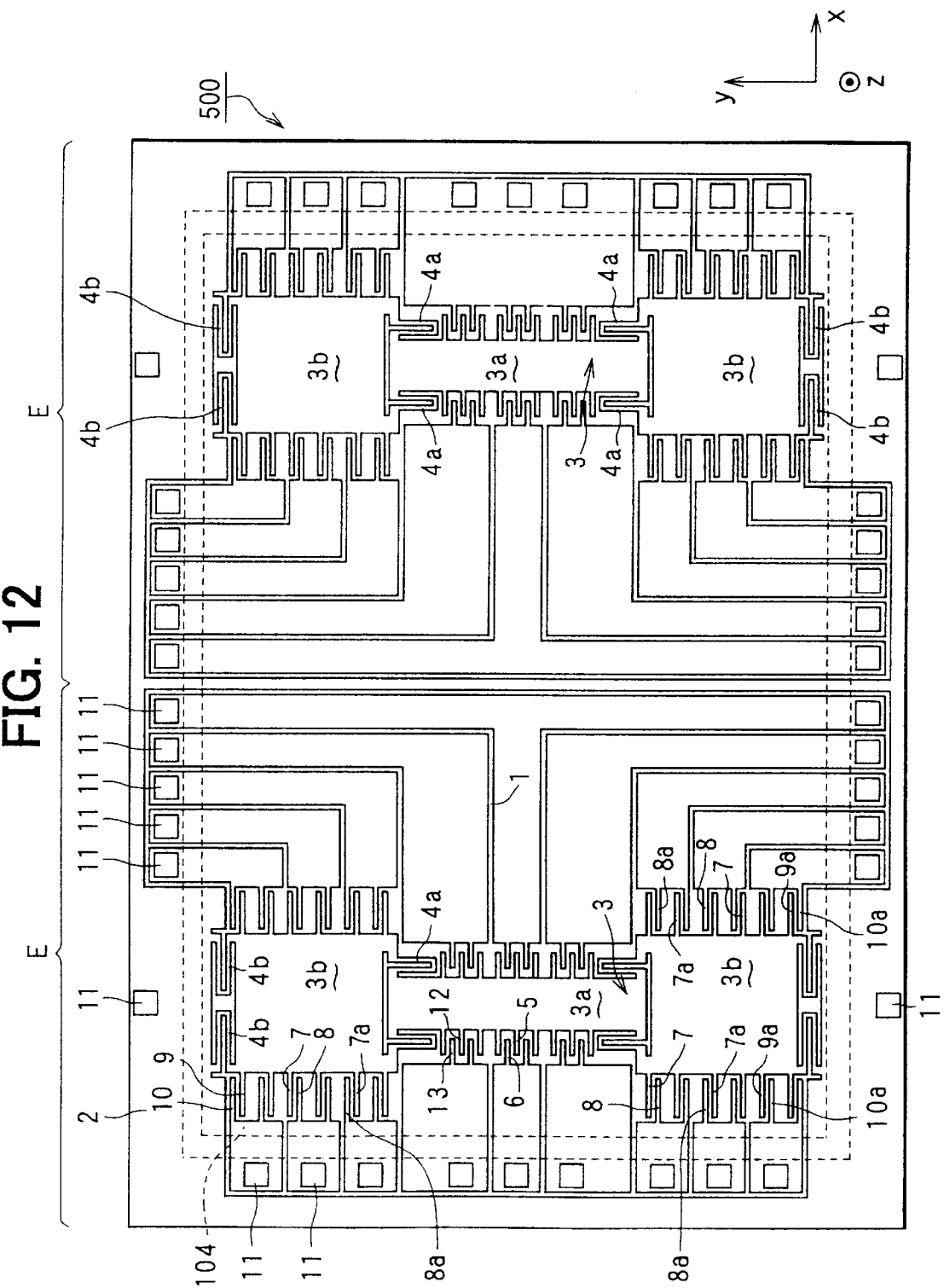
FIG. 12 is a plan view showing an angular velocity sensor in a fifth embodiment of the invention.

Next, a fifth embodiment will be explained. The present embodiment is modified and provided by combining the fourth embodiment with the second embodiment and the difference from the fourth embodiment will be mainly explained below. FIG. 12 shows an angular velocity sensor 500 of the present embodiment. While the first weight portion 3a and the second weight portions 3b constitute one weight portion 3 in the fourth embodiment, the present embodiment is different from the fourth embodiment mainly in that several (two in this example) weight portions 3, each of which is almost the same, are provided.

The angular velocity sensor 500 shown in FIG. 12 has two parts E, each of which corresponds to the angular velocity sensor 450 shown in FIG. 11, are provided in parallel in the x-axis direction. In FIG. 12, a part of the reference numerals are omitted. The shapes of the trenches 1 are changed more or less from those shown in FIG. 11 so that the electrode pads 11 are disposed at the outer peripheral part in the angular velocity sensor 500.

Next, the operation of the sensor 500 of the present embodiment will be explained by aiming mainly at the differences from those of the fourth embodiment. The operation of the first weight portion 3a and the second weight portions 3b in each of the weight portions 3 is the same as that of the fourth embodiment. The merit of the present embodiment will be exhibited specifically when the weight portions 3 are drive-oscillated so that the respective first weight portions 3a are oscillated in anti-phase because the disturbance acceleration can be canceled by the same reasons as described in the second embodiment.

That is, when both the first weight portions 3a are drive-oscillated along the driving direction x in anti-phase to each other and angular velocity is applied around the angular velocity axis z, the weight portions 3a, 3b oscillate in the detecting direction y in anti-phase to each other in the respective weight portions 3 due to the degree of freedom of the detecting beams 4b in the detecting direction y. At this time, the influence of the disturbance acceleration can be removed by taking the difference of the outputs from the two second weight portions 3b. Further, the sensitivity is doubled as compared to the fourth embodiment.

It is also possible to measure the acceleration by taking the sum of the outputs from the two second weight portions 3b in contrary. Accordingly, a sensor capable of measuring the acceleration and angular velocity in the same time can be realized. The present embodiment can also exhibit the effects obtained by keeping the several weight portions 3 independent of each other without connecting them. That is, the sensor can be miniaturized as a whole, the cost is lowered, the yield is improved, and the several driving electrodes can be disposed easily, similarly to the second embodiment.

(Sixth Embodiment)

Figure 13:
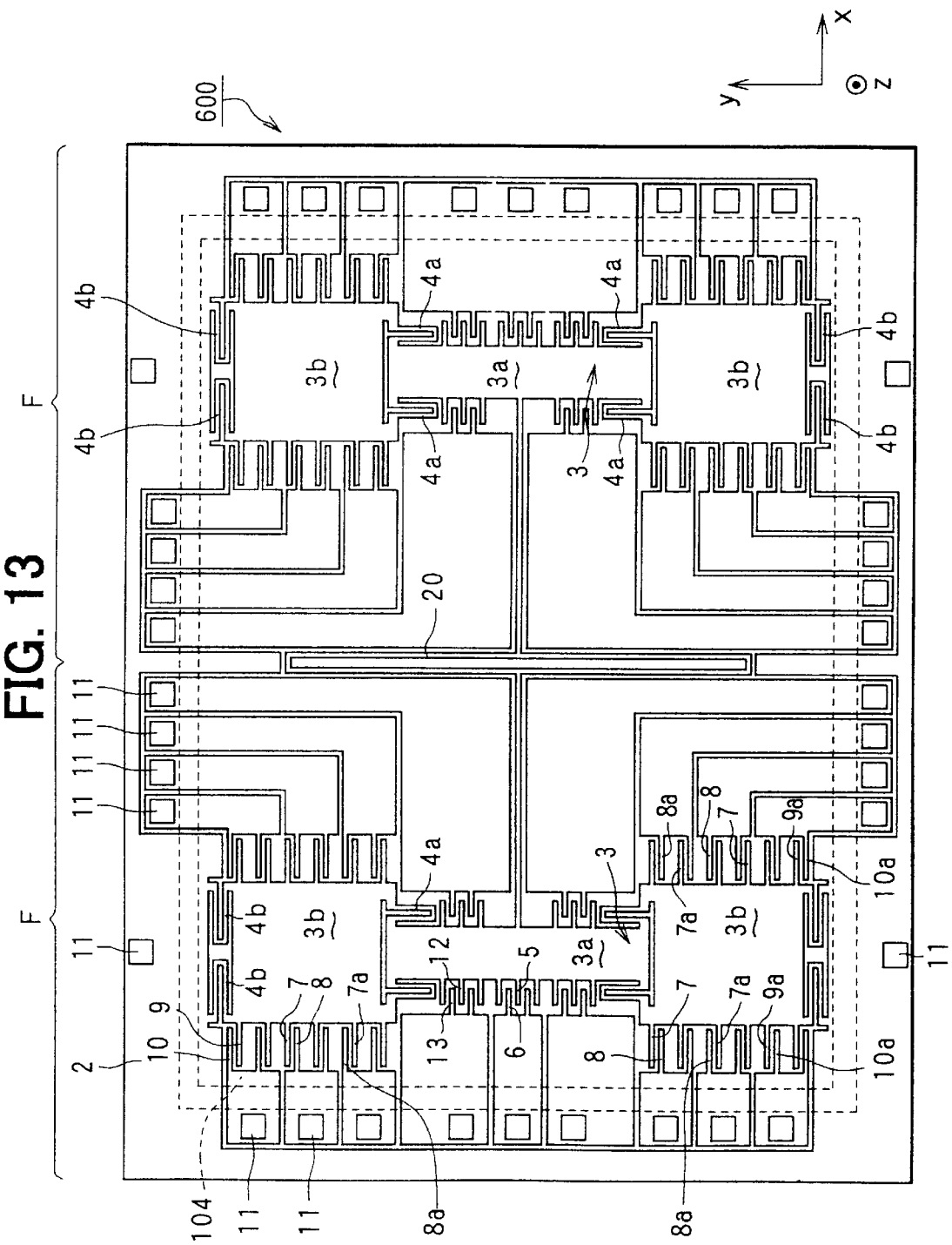
FIG. 13 is a plan view showing an angular velocity sensor in a sixth preferred embodiment of the invention.

Next, a sixth embodiment will be explained. The present embodiment is modified from the fifth embodiment, i.e., is a combination of the third embodiment and the fourth embodiment. The differences from the fifth embodiment will be mainly explained with reference to FIG. 13 showing an angular velocity sensor 600 of the present embodiment.

The angular velocity sensor 600 has two weight portions 3 each composed of the first weight portion 3a and the second weight portions 3b similarly to the angular velocity sensor 500 shown in FIG. 12. However, it is different in the following points. Specifically, there is no inner side driving electrodes 5, 6 (the right side of the left first weight portion 3a and the left side of the right side first weight portion 3a). The two first weight portions 3a are connected by the connection beam (coupled beam) 20 that is capable of displacing the two weight portions 3 in both the driving direction x and detecting direction y. It should be noted that the sensor 600 has two parts F that have the same shape and are arranged on the right and left sides.

Next, the operation of the present embodiment will be explained mainly focusing on the differences from the fifth embodiment. The operation of oscillating the first weight portions 3a in-phase or in anti-phase is the same as the fifth embodiment. The following points are also the same as the fifth embodiment.

Specifically, the influence of the acceleration can be removed by taking the difference of the output signals of the two second weight portions 3b. The sensitivity is almost doubled as compared to the fourth embodiment. Further, the acceleration can be measured by taking the sum of the outputs from the two second weight portions 3b. Thus, the sensor capable of measuring the angular velocity and acceleration at the same time can be realized depending on a signal processing method.

Further, because the two first weight portions 3a are connected by the connection beam 20 in the present embodiment, the effect obtained by a coupled oscillation system composed of the two weight portion 3 can be exhibited similarly to the third embodiment.

(Seventh Embodiment)

Figure 14:
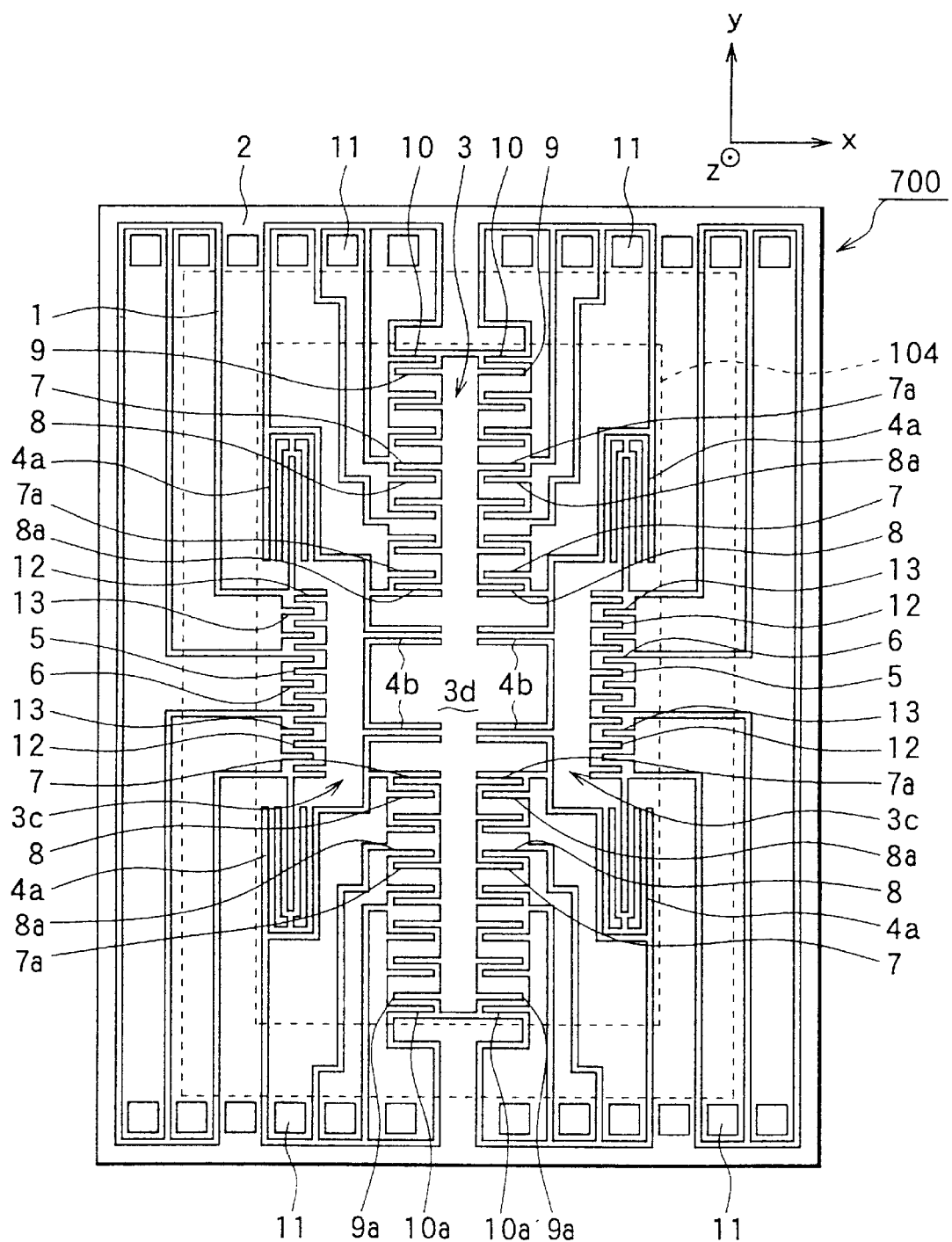
FIG. 14 is a plan view showing an angular velocity sensor in a seventh preferred embodiment of the invention.

Next, a seventh embodiment will be explained. The present embodiment is modified from the first embodiment, and the differences from the sensor 100 in the first embodiment will be explained with reference to FIG. 14. FIG. 14 shows an angular velocity sensor 700 of the present embodiment.

The present embodiment is different from the first embodiment in that the weight portion 3 is composed of first weight portions (driving weight portions) 3c, which are connected with the basal portion 2 by the driving beams 4a and are capable of being drive-oscillated in the driving direction x (first direction), and a second weight portion (detecting weight portion) 3d that is connected to the first weight portions 3c by the detecting beams 4b. The second weight portion 3d can be displaced not only in the driving direction x but also in the detecting direction y (second direction) accordingly.

That is, the second weight portion 3d is connected to the first weight portions 3c by the detecting beams 4b and the first weight portions 3c are connected to the basal portion 2 via the driving beams 4a. The beam portion of the present invention is composed of the driving beams 4a and the detecting beams 4b in the present embodiment. The four unnecessary oscillation suppressing electrodes 7, 8, 7a and 8a and two detecting electrodes 9, 10, 9a and 10a are provided at the second weight portion 3d and the basal portions 2 facing thereto, respectively.

Similarly to the fourth embodiment, the four driving beams 4a connected to the first weight portions 3c are designed so as to have the degree of freedom mainly in the driving direction x and the two detecting beams 4b connected to the second weight portion 3d are designed so as to have the degree of freedom mainly in the detecting direction y. That is, because the second weight portion 3d is connected to the first weight portions 3c, the second weight portion 3d has the degree of freedom not only in the driving direction x similarly to the first weight portion 3c but also in the detecting direction y relatively with respect to the first weight portions 3c.

Then, the first weight portions 3c can be drive-oscillated in the driving direction x together with the second weight portion 3d by the effect of the driving beams 4a when voltage is applied between the driving movable electrode 5 formed on the respective first weight portions 3c and the driving stationary electrode 6 formed on the basal portion 2 facing thereto. Then, when angular velocity is applied around the angular velocity axis z during this driving oscillation, the second weight portion 3d oscillates in the detecting direction y by the detecting beams 4b.

The oscillation monitoring electrodes 12, 13 are also formed on the first weight portions 3c and the basal portion 2 facing thereto also in the angular velocity sensor 700. The oscillation monitoring electrodes 12, 13 are used to monitor the physical quantity of the driving oscillation similarly to the first embodiment.

Next, the operation of the sensor of the present embodiment will be explained more specifically. When periodic voltage is applied to the external circuit not shown, the first weight portions 3c are drive-oscillated along the driving direction x together with the second weight portion 3d due to the degree of freedom of the driving beams 4a in the driving direction x. Here, the first weight portion 3c is not drive-oscillated (displaced), the capacity between the detecting electrodes 9, 10, 9a and 10a changes due to the simple driving oscillation (pure oscillation in the driving direction).

Although it seems a demerit of the present embodiment differing from the fourth embodiment, it actually poses almost no problem because the influence of the driving oscillation may be canceled by taking the sum of the outputs of the adjacent two detecting electrodes.

The resonant driving or non-resonant driving described above may be adopted also in the present embodiment. It is also advantageous to adopt the ACG because it can remove the temperature dependency of the driving amplitude and can suppress the temperature drift of the sensitivity.

When angular velocity is applied around the angular velocity axis z in state where the first weight portions 3c and the second weight portion 3d are drive-oscillated, the second weight portion 3d oscillates in the detecting direction y due to the degree of freedom of the detecting beams 4b by the Corioli's force applied to the second weight portion 3d. At this time, the angular velocity Ω can be detected by detecting differentially the capacity of the detecting electrodes 9, 10 and the capacity of the detecting electrodes 9a, 10a in the same manner as in the first embodiment.

Here, the first weight portions 3c, the driving electrodes 5, 6 and the oscillation monitoring electrodes 12, 13 are not displaced in the detecting direction by the detecting oscillation. It means that the detecting oscillation is not influenced by the electrostatic forces of the driving electrodes 5, 6 and the oscillation monitoring electrodes 12, 13, resulting in accurate detection of the angular velocity.

Further, although the spring constant of the detecting beams 4b is often reduced as compared to that of the driving beams 4a to increase the sensitivity in general, the detecting beams are positioned inside of the driving beams connected to the basal portion in the present embodiment. Therefore, the resonant frequency in the direction of the angular velocity axis z can be readily increased. It is very advantageous to realize the sensor having less noise because it is possible to readily avoid the unnecessary oscillation by which the weight portion resonates in direction of the angular velocity axis z.

The method for suppressing the unnecessary oscillation caused by the processing error (processing error of the driving beams 4a in particular) in the angular velocity sensor 700 can be executed by using the unnecessary oscillation suppressing electrodes 7, 8, 7a and 8a similarly to the first embodiment. Accordingly, as described in the first embodiment referring to FIGS. 5A to 5D, no output is outputted at all when angular velocity is zero and only an angular velocity signal is detected when the angular velocity is applied.

(Eighth Embodiment)

Figure 15:
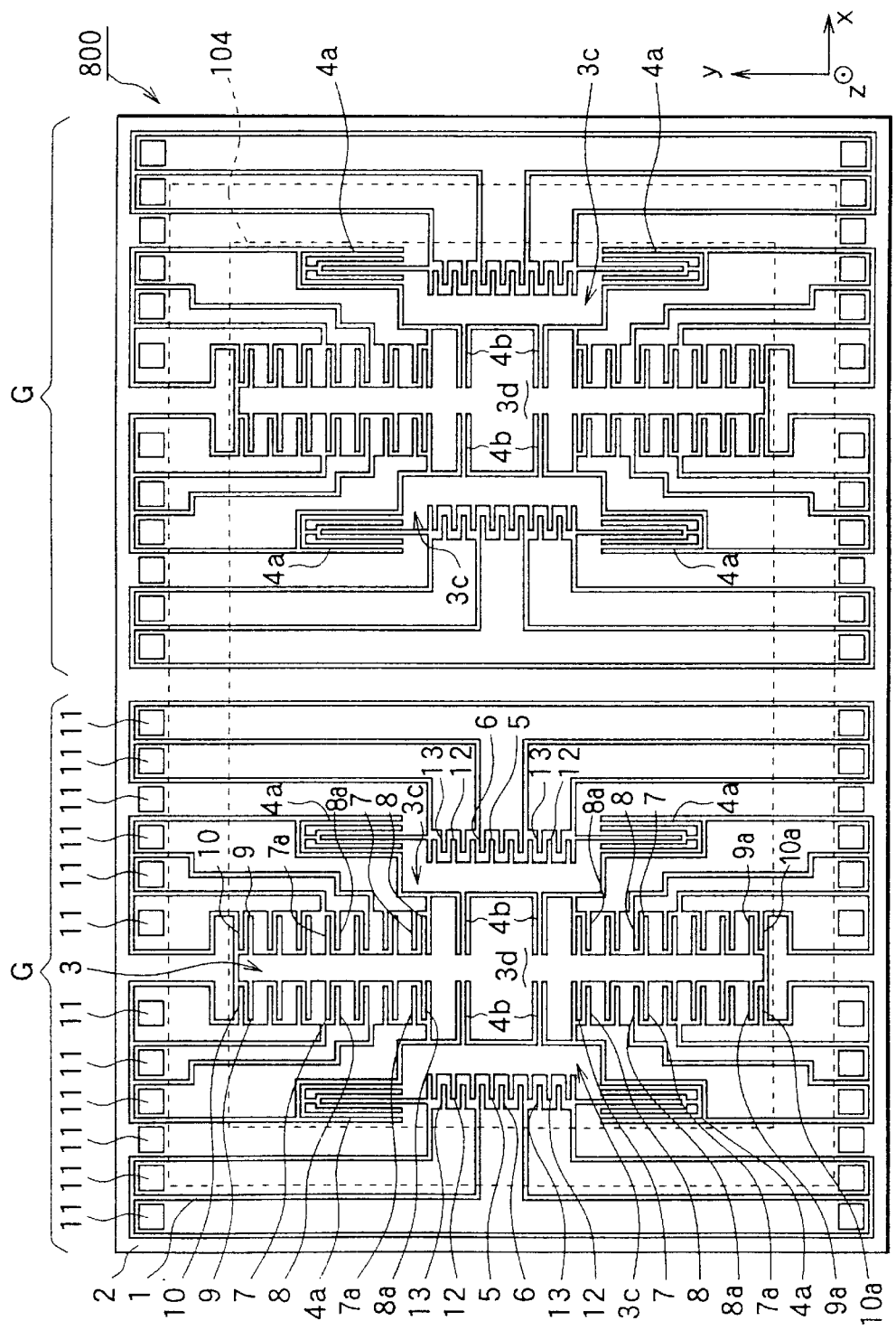
FIG. 15 is a plan view showing an angular velocity sensor in an eighth preferred embodiment of the invention.

Next, an eighth embodiment will be explained. The present embodiment is a modification provided by combining the seventh embodiment with the second embodiment, and the differences from the seventh embodiment will be mainly explained. FIG. 15 shows an angular velocity sensor 800 of the present embodiment. Although the seventh embodiment has one weight portion 3 composed of the two first weight portions 3c and the second weight portion 3d, the present embodiment is different from the seventh embodiment in that several (two in this example) weight portions 3, each of which is almost the same, are provided.

Specifically, the angular velocity sensor 800 shown in FIG. 15 has two parts G, each of which corresponds to the angular velocity sensor 700 shown in FIG. 14 and which are provided in parallel in the x-axis direction. A part of the reference numerals are omitted in FIG. 15.

Next, the operation of the sensor 800 of the present embodiment will be explained by aiming mainly at the differences from the seventh embodiment. The operation of the first weight portion 3c and the second weight portion 3d in each of the weight portions 3 is substantially the same as that of the seventh embodiment. However, the merit of the present embodiment will be exhibited specifically when the two weight portions 3 are drive-oscillated in anti-phase to each other because the disturbance acceleration can be canceled due to the same reason as that of the second embodiment.

That is, when both the weight portions 3 are drive-oscillated along the driving direction x in anti-phase to each other and angular velocity is applied around the angular velocity axis z, the weight portions 3c in the respective weight portions 3 oscillate in the detecting direction y in anti-phase to each other due to the degree of freedom of the detecting beams 4b in the detecting direction y. At this time, the influence of the disturbance acceleration can be removed by taking the difference of the outputs from the two second weight portions 3d. The present embodiment also has a merit that the sensitivity is doubled as compared to the seventh embodiment.

It is also possible to measure the acceleration by taking the sum of the outputs from the two second weight portions 3d in contrary. Accordingly, a sensor capable of measuring the acceleration and angular velocity at the same time can be realized by processing the signals. The present embodiment can also exhibit the effects obtained by keeping the plurality of weight portions 3 independent from each other without connecting them. That is, the sensor can be miniaturized as a whole, the cost is reduced, the yield is improved, and the several driving electrodes can be positioned readily, similarly to the second embodiment.

(Ninth Embodiment)

Figure 16:
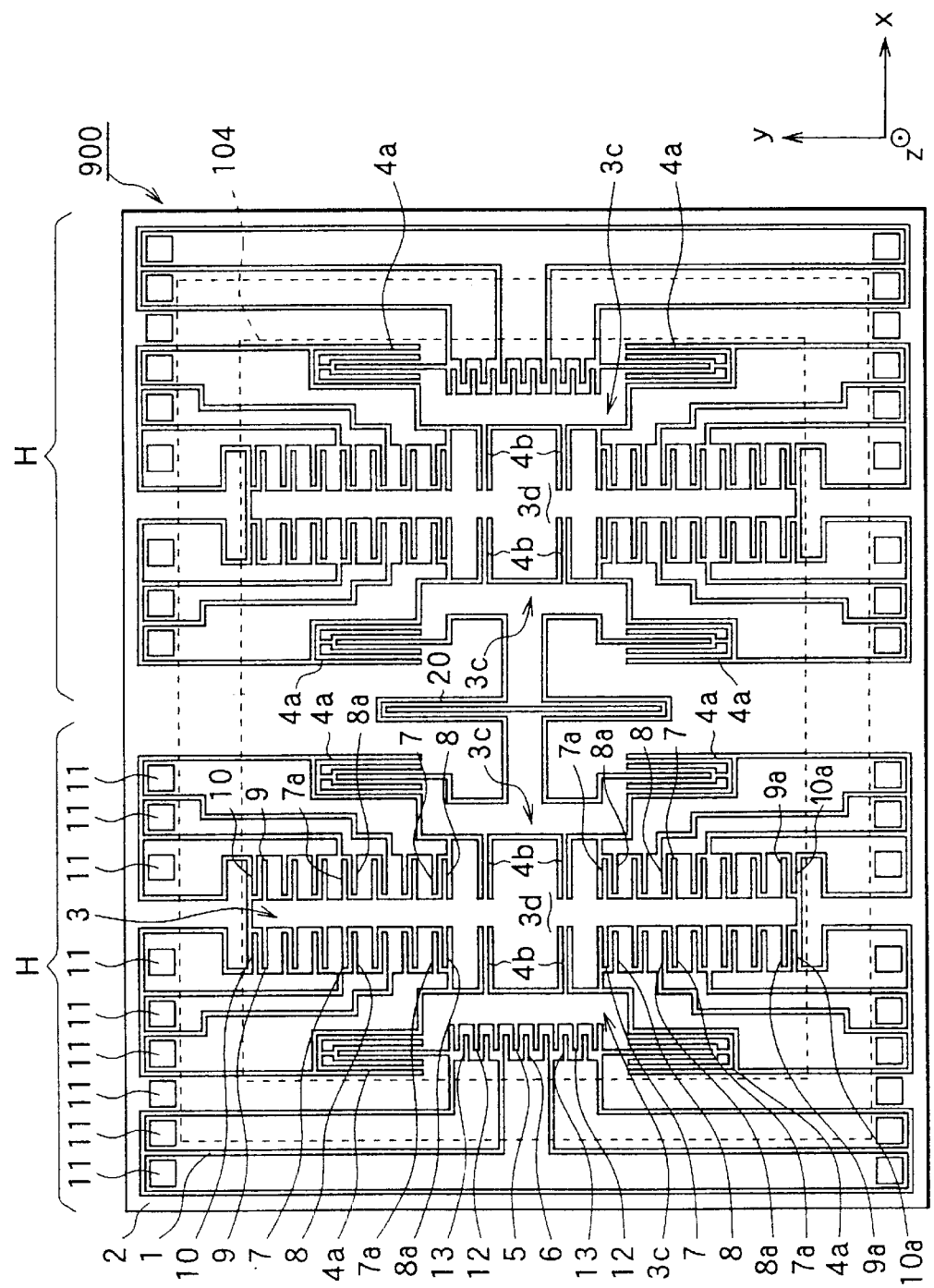
FIG. 16 is a plan view showing an angular velocity sensor in a ninth preferred embodiment of the invention.

Next, a ninth embodiment will be explained. The present embodiment is modified from the eighth embodiment, and is a combination of the seventh embodiment and the third embodiment. The differences from the eighth embodiment will be mainly explained with reference to FIG. 16 showing an angular velocity sensor 900 of the present embodiment.

Although the angular velocity sensor 900 has two weight portions 3 composed of the first weight portion 3c and the second weight portions 3d similarly to the angular velocity sensor 800 shown in FIG. 15, it is different in that there is no inner side driving electrodes 5, 6 (the right side of the left first weight portion 3c and the left side of the right side first weight portion 3c) and no oscillation monitoring electrodes 12, 13. It is further different in that two first weight portions 3c of the two weight portions 3 are connected by the connection beam (coupled beam) 20 that is capable of displacing the two first weight portions 3c in both the driving direction x and detecting direction y. The sensor 900 has two parts H having the same shape and arranged on the right and left sides.

Next, the operation of the present embodiment will be explained mainly focusing on the differences from the eighth embodiment. The operation of oscillating the respective weight portions 3 (the first weight portion 3c and the second weight portion 3d) in-phase or in anti-phase is the same as that in the eighth embodiment. The following points are also the same as those in the eighth embodiment.

Specifically, the influence of the acceleration can be removed by taking the difference of the output signals of the two second weight portions 3d, the sensitivity is almost doubled as compared to the seventh embodiment, and the acceleration can be measured by taking the sum of the outputs from the two second weight portions 3d. Accordingly, the sensor capable of measuring the angular velocity and acceleration in the same time can be realized depending on a signal processing method.

Further, because the two first weight portions 3c are connected by the connection beam 20 in the present embodiment, the effect obtained by the coupled oscillation system formed by the two weight portions 3 can be exhibited similarly to the third embodiment.

(Other Embodiments)

While the respective embodiments have been described above, the following points may be cited as items common to all of the embodiments. At first, the method by means of the electrostatic force has been mainly described as the method for suppressing the unnecessary oscillation in the respective embodiments. This is because the method using the electrostatic force can simplify the manufacturing process, requires less number of parts, and allows the miniaturization.

However, it is also possible to use a piezoelectric element as unnecessary oscillation suppressing means. In this case, for instance, a piezoelectric thin film (piezoelectric element, not shown) such as PZT is formed on the beam portion 4 or the driving beam 4a, and external force is applied to the weight portion 3 in the detecting direction y by utilizing strain produced when an electrical signal is applied to the piezoelectric thin film. Accordingly, the unnecessary oscillation can be suppressed. Because the piezoelectric element can produce, by the applied voltage, large strain for suppressing the unnecessary oscillation of the weight portion, the required voltage is small.

A member that generates Lorentz's force as the external force to be applied to the weight portion 3 may be adopted as the unnecessary oscillation suppressing means. Specifically, for instance, a wiring member not shown may be formed on the weight portion 3 or the second weight portion 3b via the beam portion 4 or the detecting beam 4b so that current flowing in this wiring member interacts with a permanent magnet or an electromagnet (not shown) provided at the outside, as means for generating the Lorentz's force. Then, the Lorentz's force can be controlled by regulating the current flowing through the wiring member or by controlling the current flowing through the electromagnet. In this control method, the leakage of the voltage to the detection side used for the unnecessary oscillation suppressing means becomes less liable to affect the detection of the angular velocity by flowing DC current in the wiring member on the weight portion. When the permanent magnet is used, power consumption can be decreased.

The unnecessary oscillation suppressing means using the Lorentz's force has a merit that the voltage applied to the wiring member or the electromagnet is less liable to cause noise by leakage thereof to the angular velocity detecting side, and the value is small even if it leaks. It also can generate the Lorentz's force through simple processes by providing the wiring member on the weight portion via the beam portion.

There may be three or more weight portions 3 in the second, third, fifth and sixth embodiments described above. In the third and sixth embodiments, at least two of the several weight portions 3 should be connected by the connection beam 20. The two weight portions 3 may be connected by several (more than one) connection beams 20.

Further, the electrostatic driving or electrostatic detection using the comb-teeth electrodes have been exemplified as the driving means for drive-oscillating the weight portion 3 and the angular velocity detecting means in the respective angular velocity sensors described above. However, the present invention is not limited to that. The present invention is applicable regardless of the driving method and the detecting method. For instance, the present invention can exhibit the similar effects also in the angular velocity sensor adopting the driving or detection method using electromagnetic force or a piezoelectric element and a strain gage.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An angular velocity sensor comprising:
    a basal portion;
    a weight portion connected to the basal portion;
    a beam portion connecting the weight portion to the basal portion and supporting the weight portion to allow the weight portion to be drive-oscillated in a first direction, and to be oscillated in a second direction when an angular velocity is applied around an angular velocity axis in a state where the weight portion is drive-oscillated, the angular velocity axis being perpendicular to the first direction and the second direction; and
    unnecessary oscillation suppressing means for applying an external force to the weight portion in the second direction to prevent the weight portion from being drive-oscillated in a direction other than the first direction.

2. The angular velocity sensor of claim 1, wherein the weight portion includes a plurality of weight portions which are displaceable independently of each other.

3. The angular velocity sensor of claim 1, wherein the weight portion includes first and second weight portions connected to each other by a connection beam.

4. The angular velocity sensor of claim 1, wherein the weight portion includes first and second weight portions that are drive-oscillated in anti-phase to each other.

5. The angular velocity sensor of claim 1, wherein the unnecessary oscillation suppression means generates an electrostatic force as the external force to be applied to the weight portion.

6. The angular velocity sensor of claim 5, wherein the unnecessary oscillation suppression means has basal portion side comb-teeth electrodes protruding from the basal portion, and weight portion side comb-teeth electrodes protruding from the weight portion to be engaged with the basal portion side comb-teeth electrodes, and generates an electrostatic force between the basal portion side comb-teeth electrodes and the weight portion side comb-teeth electrodes.

7. The angular velocity sensor of claim 6, wherein one of the weight portion side comb-teeth electrodes is positioned to be closer to either one of two basal side comb-teeth electrodes adjacent thereto rather than a center of a gap between the two basal side comb-teeth electrodes.

8. The angular velocity sensor of claim 1, further comprising a driving member for drive-oscillating the weight portion by an electrostatic force generated between the weight portion and the basal portion.

9. The angular velocity sensor of claim 1, further comprising a monitoring member for monitoring a physical quantity of driving oscillation of the weight portion.

10. The angular velocity sensor of claim 9, wherein a driving amplitude of the driving oscillation of the weight portion is controlled to be constant by a negative feedback using a result obtained by the monitoring member.

11. The angular velocity sensor of claim 1, wherein:

the weight portion has a first weight portion, and a second weight portion that is connected to the first weight portion via a driving beam and connected to the basal portion via a detecting beam;

the first weight portion is drive-oscillated in the first direction;

both the first weight portion and the second weight portion are oscillated by the detecting beam in the second direction when the angular velocity is applied around the angular velocity axis in the state where the first weight portion is drive-oscillated; and the angular velocity is detected based on oscillation of the second weight portion in the second direction.

12. The angular velocity sensor of claim 1, wherein:

the weight portion has a first weight portion that is connected to the basal portion via a driving beam, and a second weight portion that is connected to the first weight portion via a detecting beam;

the first weight portion and the second weight portion are drive-oscillated in the first direction;

the second weight portion is oscillated in the second direction by the detecting beam when the angular velocity is applied around the angular velocity axis in the state where the first weight portion and the second weight portion are drive-oscillated; and the angular velocity is detected based on oscillation of the second weight portion in the second direction.

13. An angular velocity sensor for detecting an angular velocity applied around an angular velocity axis, comprising:

a basal portion;

a weight portion connected to the basal portion to be drive-oscillated in a first direction to perform driving oscillation, and to be oscillated in a second direction to perform detecting oscillation to detect the angular velocity when the angular velocity is applied to the weight portion performing the driving oscillation, the first direction and the second direction being perpendicular to the angular velocity axis; and an unnecessary oscillation suppressing member integrally provided with the weight portion to generate an external force that is applied to the weight portion in the second direction to prevent the weight portion from being drive-oscillated in the second direction when no angular velocity is applied.

14. The angular velocity sensor of claim 13, wherein:

the unnecessary oscillation suppressing member includes a weight portion side electrode integrated with the weight portion, and a basal portion side electrode integrated with the basal portion and facing the weight portion side electrode; and the weight portion side electrode and the basal portion side electrode generate an electrostatic force as the external force by a voltage applied therebetween.

* * * * *